(12) United States Patent
Kan

(10) Patent No.: US 8,966,087 B2
(45) Date of Patent: Feb. 24, 2015

(54) LOAD CHARACTERISTIC ESTIMATION SYSTEM, LOAD CHARACTERISTIC ESTIMATION METHOD, AND PROGRAM

(75) Inventor: Masaki Kan, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 13/514,041

(22) PCT Filed: Dec. 6, 2010

(86) PCT No.: PCT/JP2010/071812
§ 371 (c)(1),
(2), (4) Date: Jun. 5, 2012

(87) PCT Pub. No.: WO2011/071010
PCT Pub. Date: Jun. 16, 2011

(65) Prior Publication Data
US 2012/0246324 A1    Sep. 27, 2012

(30) Foreign Application Priority Data

Dec. 8, 2009 (JP) ................................ 2009-278445

(51) Int. Cl.
*G06F 15/173* (2006.01)
*G06F 11/34* (2006.01)
(52) U.S. Cl.
CPC ........ *G06F 11/3433* (2013.01); *G06F 11/3442* (2013.01)
USPC ............ 709/226; 709/223; 709/224; 709/235
(58) Field of Classification Search
CPC ... G06F 9/5083; G06F 9/505; G06F 11/3419; G06F 11/3442; G06F 9/3832; H04L 41/5009; H04L 41/5096; H04L 43/062; H04L 43/16; H04L 47/11; H04L 43/08; H04L 47/283; H04L 67/1002; H04L 67/1008
See application file for complete search history.

(56) References Cited

U.S. PATENT DOCUMENTS 6,418,425 B1   7/2002   Maeda et al.
7,542,877 B2   6/2009   Nakamura
(Continued)

FOREIGN PATENT DOCUMENTS

JP   H4-186445 A   7/1992
JP   H5-324358 A   12/1993
(Continued)

OTHER PUBLICATIONS

International Search Report in PCT/JP2010/071812 dated Jan. 11, 2011(English Translation Thereof).
(Continued)

*Primary Examiner* — Mohamed Ibrahim
(74) *Attorney, Agent, or Firm* — McGinn IP Law Group, PLLC

(57) ABSTRACT

A load characteristic estimation system includes: a program input unit into which a program that runs on a prescribed computer system is inputted; a program feature information acquisition unit that obtains features from the inputted program; and a load characteristic estimation unit that estimates a load characteristic of the inputted program by reading load characteristic information of another program having a feature similar to the inputted program, from a load characteristic recording unit that records a load characteristic produced in the prescribed computer system when the other program was run on the computer system in the past.

20 Claims, 13 Drawing Sheets

(56) References Cited

U.S. PATENT DOCUMENTS

| | | | |
|---|---|---|---|
| 2003/0158930 A1* | 8/2003 | Mc Bride | 709/223 |
| 2005/0193113 A1* | 9/2005 | Kokusho et al. | 709/225 |
| 2007/0185996 A1* | 8/2007 | Bivens et al. | 709/226 |
| 2008/0004841 A1 | 1/2008 | Nakamura | |
| 2008/0222646 A1* | 9/2008 | Sigal et al. | 718/105 |
| 2009/0240476 A1* | 9/2009 | Kshirsagar et al. | 703/2 |

FOREIGN PATENT DOCUMENTS

| | | |
|---|---|---|
| JP | H6-95931 A | 4/1994 |
| JP | H8-137725 A | 5/1996 |
| JP | H10-27099 A | 1/1998 |
| JP | 2000-155681 A | 6/2000 |
| JP | 2002-229818 A | 8/2002 |
| JP | 2005-165673 A | 6/2005 |
| JP | 2008-009842 A | 1/2008 |
| JP | 2009-266044 A | 11/2009 |

OTHER PUBLICATIONS

S. Kawaguchi, M. Matsushita, K. Inoue, "Software Classification Tool Using Latent Semantic Analysis", Information Processing Society of Japan Research Report, Software Engineering Research Report, 2003 (22), pp. 55-62, Mar. 6, 2003.

The Apache Software Foundation, "Apache Hadoop", [online], [search conducted on Sep. 10, 2009], Internet <URL: http://hadoop.apache.org/>.

T. Tokunaga, "Information Retrieval and Language Processing", University of Tokyo Press, Nov. 1999.

X. Fan, W. Weber and L.A. Barroso, "Power provisioning for a warehouse-sized computer", In Proceedings of the 34th Annual International Symposium on Computer Architecture (San Diego, California, USA, Jun. 9-13, 2007), ISCA07, ACM, New York, NY, 13-23, 2007, DOI = http://doi.acm.org/10.1145/1250662.1250665.

K. Kita, K. Tsuda, M. Shishibori, "Information Retrieval Algorithm", Kyoritsu Shuppan, Jan. 2002.

Notice of Grounds for Rejection dated Mar. 4, 2014, with partial English translation.

* cited by examiner

FIG. 8

| PROGRAM IDENTIFIER | EXECUTION TIME (Sec) | REQUIRED INPUT OUTPUT AMOUNT (Byte) | REQUIRED POWER (W) |
|---|---|---|---|
| ProgramA | 20 | 10 | 2000 |
| ProgramB | 40 | 30 | 5000 |
| ProgramC | 5 | 100 | 1000 |
| ProgramA | 50 | 25 | 4000 |
| .. | .. | .. | .. |

FIG. 9

| PROGRAM IDENTIFIER | NUMBER OF EXECUTIONS | AVERAGE EXECUTION TIME (Sec) | REQUIRED INPUT OUTPUT AMOUNT (Byte) | REQUIRED POWER (W) |
|---|---|---|---|---|
| ProgramA | 2 | 35 | 17.5 | 3000 |
| ProgramB | 1 | 40 | 30 | 5000 |
| ProgramC | 1 | 5 | 100 | 1000 |
| .. | .. | .. | .. | .. |

FIG. 10

| PROGRAM IDENTIFIER | LOAD CHARACTERISTIC EVALUATION VALUE A (EXECUTION TIME / DATA CAPACITY) | LOAD CHARACTERISTIC EVALUATION VALUE B (REQUIRED INPUT OUTPUT AMOUNT / DATA CAPACITY) | LOAD CHARACTERISTIC EVALUATION VALUE C (REQUIRED POWER / DATA CAPACITY) |
|---|---|---|---|
| ProgramA | 0.5 | 0.25 | 50 |
| ProgramB | 4 | 3 | 500 |
| ProgramC | 0.05 | 1 | 100 |
| ProgramA | 1 | 0.5 | 80 |
| ... | ... | ... | ... |

LOAD CHARACTERISTIC ESTIMATION SYSTEM, LOAD CHARACTERISTIC ESTIMATION METHOD, AND PROGRAM

TECHNICAL FIELD

1. Reference to Related Application

This application is based upon and claims the benefit of priority of Japanese Patent Application No. 2009-278445, filed on Dec. 8, 2009, the disclosure of which is incorporated herein in its entirety by reference thereto.

The present invention relates to a load characteristic estimation system, a load characteristic estimation method, and computer program (hereafter "program"), and in particular relates to a load characteristic estimation system, a load characteristic estimation method, and program, that estimate a load characteristic of a program with unknown load characteristics to be given to a computer system.

2. Background

Recently, with the advent of large scale distributed data processing frameworks known as "MapReduce", developed by Google Inc., and the open source implementation "Hadoop" (Non-Patent Document 2), and with cloud computing trends and the emergence of services following this way of thinking, it is becoming possible to relatively easily implement and run programs that process large volumes of data.

Such large volume data processing programs inevitably require many computer resources. Storage capacity must at least be sufficient for the data to be processed, and although dependent on processing content and method of storing in the data storage, large memory capacity and CPU resources used in computation are necessary.

With the development of PC cluster technology, it has become relatively easy to provide a large amount of computer resources, but there is a difficulty due to the high cost of providing a large amount of computer resources that can be used exclusively by all users. In view of this situation, there are services wherein it is possible to use only the computer resources required, which are charged in accordance with amount used, and wherein large scale computer environments are shared by a plurality of people.

In Non-Patent Document 1, LSA (Latent Semantic Analysis), which is a technique of classifying documents described in natural language, is used to realize automatic classification of programs. In this technology, classification for each library or function in shared usage among programs, and classification in accordance with common architecture are realized. However, consideration is not given concerning which behavior characteristics to show when programs classified by this technique are executed in a computer.

Patent Document 1 discloses a program execution time analysis method for statically analyzing a program to estimate execution time (performance value), without actually running on a computer.

Patent Document 2 discloses technology for comprehending an effect on restoration/recovery processing when there is a malfunction and performing control such as scheduling or the like, by collecting history information (operation state, execution processing, events) for a computer system and recording correlations among the information items.

Cited Publication 3 discloses a method for extracting a similar case that is similar to a given unknown case, from already known cases, and using the extracted similar case to make an estimation regarding the unknown case.

[Patent Document 1]
Japanese Patent Kokai Publication No. JP2002-229818A
[Patent Document 2]
Japanese Patent Kokai Publication No. JP2008-9842A
[Patent Document 3]
Japanese Patent Kokai Publication No. JP2000-155681A
[Non-Patent Document 1]
S. Kawaguchi, M. Matsushita, K. Inoue, "Software Classification Tool Using Latent Semantic Analysis", Information Processing Society of Japan Research Report, Software Engineering Research Report, 2003 (22), pp. 55-62. 20030306
[Non-Patent Document 2]
The Apache Software Foundation, "Apache Hadoop", [online], [search conducted on Sep. 10, 2009], Internet <URL: http://hadoop.apache.org/>
[Non-Patent Document 3]
T. Tokunaga, "Information Retrieval and Language Processing", University of Tokyo Press,
Nov. 1999
[Non-Patent Document 4]
X. Fan, W. Weber and L.A. Barroso, "Power provisioning for a warehouse-sized computer", In Proceedings of the 34th Annual International Symposium on Computer Architecture (San Diego, California, USA, Jun. 09-13, 2007), ISCA07, ACM, New York, NY, 13-23, 2007, DOI =http://doi.acm.org/10.1145/1250662.1250665
[Non-Patent Document 5]
K. Kita, K. Tsuda, M. Shishibori, ˉInformation Retrieval Algorithm", Kyoritsu Shuppan,

SUMMARY

The entire disclosures of the abovementioned Patent Documents 1 to 3 and Non-Patent Documents 1 to 5 are incorporated herein by reference thereto. The following analysis is given according to the present invention. With the emergence of frameworks such as MapReduce described above and the like, when it becomes possible for a general programmer to use this type of large scale computer environment relatively easily, it is expected that programs with large volume data processing will be created by trial and error. However, for many programmers it is difficult to predict what amount of computer resources will be required by a program created. Therefore, when using a service that utilizes computer resources which are charged in accordance with the amount used, it is desired to know what the necessary cost will be for this processing. In addition, if it is not known what amount of resources are used when a computer is shared among a plurality of people, inconvenience may be caused to other users.

As described above, at present there is a problem in that there is no way of obtaining load characteristics that may be produced in a computer system by running a program which is unknown to the computer system in question and which has not been executed. A reason for this is that since no past execution result exists as an execution precedent for an unknown program that has not heretofore been processed on the computer system, load characteristics thereof are unknown.

In addition, there is a problem in that a user who has developed the program cannot recognize program load characteristics, that is, what load is given to the computer system by the created program, or what level of resources is necessary in executing the program. A reason for this is that since an environment enabling easy use of a large scale distributed platform, as described in the background art, has only been set out recently, general programmers are not sufficiently educated in this regard and cannot predict load characteristics at the time of coding. Furthermore, in a large volume data analysis processing program, logic descriptions, such as processing of data that satisfies a certain condition, among all the data, may occur, but since the user may not necessarily be aware of the total data volume and the volume and proportion of data satisfying this condition, estimation of the load characteristics is difficult.

With regard to this point, a method of Patent Document 1 analyzes the processing structure and data structure of a source program to obtain program execution time, but this type of static analysis technique can be generally used only after a computer system running the program in question is confirmed in advance. Using the same technique in an environment where a user uses a plurality of computer resources via the abovementioned network, it is impossible to obtain the program execution time with high accuracy. Furthermore, since this type of analysis technique is for comprehending the processing structure of the program, in order to take in the differences in description formats of each program language, it is necessary to provide an analysis means for each language. Also, character strings for identifiers (variable names and the like) described within the source code by the programmer are only handled as symbols, similar to a compiler, and the programmer cannot give consideration to meaning included in the names of the identifiers.

Technology disclosed in Patent Document 2 is for collecting computer system operation states and detecting malfunctions in the computer system, and is not for estimating load characteristics that may occur in the computer system due to running a program with unknown characteristics.

Furthermore, technology disclosed in Patent Document 3 is for extracting similar cases and increasing speed, but is not for estimating the load characteristics of an unknown program running in a computer system and applying to the computer system.

It is an object thereof to provide a load characteristic estimation system, a load characteristic estimation method, and a program, which estimate load characteristics of a program without actually running the program.

According to a first aspect of the present invention there is provided a load characteristic estimation system, comprising: a program input unit into which a program that runs on a prescribed computer system is inputted; a program feature information acquisition unit that obtains features from the inputted program; and a load characteristic estimation unit that estimates a load characteristic of the inputted program by reading load characteristic information of another program having a feature similar to the inputted program, from a load characteristic recording unit that records a load characteristic which was produced in the prescribed computer system when the other program was run on the computer system in the past.

According to a second aspect of the present invention there is provided a load characteristic estimation method, comprising: receiving input of a program to be run on a prescribed computer system, from a user; obtaining a feature from the inputted program; and estimating a load characteristic of the inputted program by reading load characteristic information of another program having a feature similar to the inputted program, from a load characteristic recording unit that records a load characteristic which was produced in the prescribed computer system when the other program was run on the computer system in the past. The present method is linked to a specific device known as a computer that is provided with a load characteristic recording unit that stores load characteristics of a known program group.

According to a third aspect of the present invention there is provided a computer program that executes on a computer: a process of receiving input of a program to be run on a prescribed computer system, from a user; a process of obtaining a feature from the inputted program; a process of estimating a load characteristic of the inputted program by reading load characteristic information of another program having a feature similar to the inputted program, from a load characteristic recording unit that records a load characteristic which was produced in the prescribed computer system when the other program was run on the computer system in the past. It is to be noted that that the program can be recorded on a computer readable storage medium. That is, the present invention can be embodied as a computer program product. Also the computer program may be regarded as either a program product (i.e. manufacture) or a process embodying the data storage method (process), expressed in a program language.

The meritorious effects of the present invention are summarized as follows.

According to the present invention it is possible to estimate a load characteristic of a computer program that has not been run on a target computer system, and it is possible to provide the load characteristic to a programmer and to enable usage thereof in scheduling of the computer system. A reason for this is that a configuration thereof reads load characteristic information of a program having a feature similar to the inputted program, from a load characteristic recording unit that records a load characteristic which was produced in the prescribed computer system when another program was run on the computer system in the past, and estimates a load characteristic of the inputted program.

BRIEF DESCRIPTION OF THE DRAWINGS

FIG. 8 is a diagram showing an example of load characteristic information held in a load characteristic storage unit of the first exemplary embodiment of the invention;

FIG. 9 is a diagram showing another example of load characteristic information held in the load characteristic storage unit of the first exemplary embodiment of the invention;

FIG. 10 is a diagram showing a further example of load characteristic information held in the load characteristic storage unit of the first exemplary embodiment of the invention;

PREFERRED MODES

Figure 1:
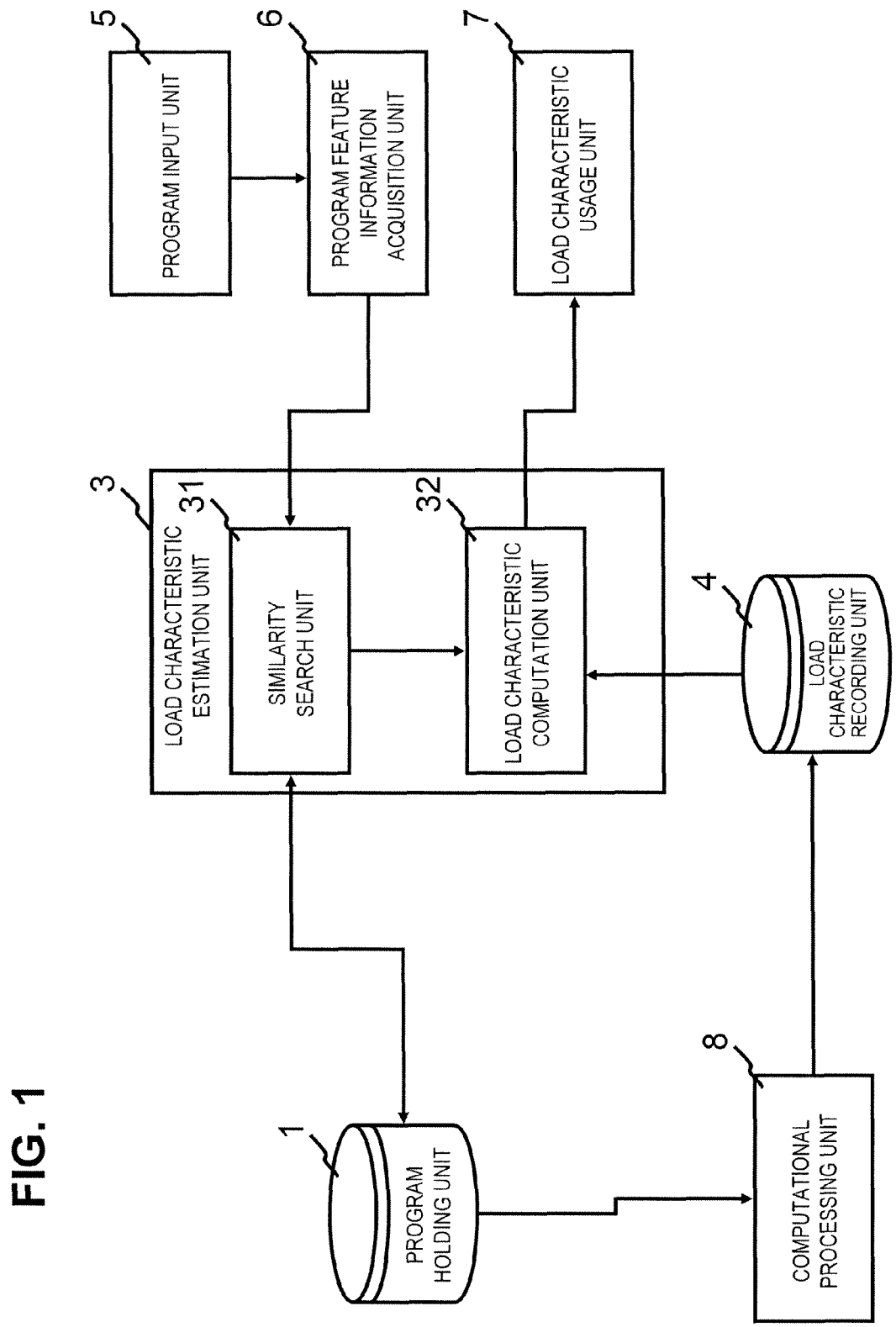
FIG. 1 is a diagram for describing an outline of the present invention.

First, a description is given of an outline of an exemplary embodiment of the present invention. A load characteristic estimation system according to the exemplary embodiment of the present invention, as shown in FIG. 1, is provided with a program input unit 5 that receives input of a program to be run on a target computer system from a user, a program feature information acquisition unit 6 that obtains a feature of the program inputted from the program input unit 5, and a load characteristic estimation unit 3 that estimates a load characteristic of the inputted program. The load characteristic estimation unit 3 can be configured to include a similarity search unit 31 that performs a similarity search using a feature of the inputted program and a feature of a known program with already known load characteristics held in a program holding unit 1, and a load characteristic computation unit 32 that estimates a load characteristic of the inputted program by reading a load characteristic of a similar program from a load characteristic recording unit 4. In this way, it is possible to estimate the load characteristic of the program without actually running the program on the target computer system. Such a load characteristic is used in a load characteristic usage unit 7, for example, in decision-making by a user regarding whether or not to execute the inputted program, or in scheduling of the inputted program. It is to be noted that drawing reference symbols noted in this outline are examples solely for aiding understanding, and are not intended to limit the invention to modes of the drawings shown. In the present invention, the following modes are possible.

(Mode 1)

As in the load characteristic estimation system described in the first aspect.

(Mode 2)

The load characteristic estimation system is preferably provided with a feature information holding unit that holds feature information of a program run on the prescribed computer system, and a similarity search unit that performs a search of similar programs using feature information held in the feature information holding unit and feature information of the inputted program.

(Mode 3)

The load characteristic estimation unit preferably estimates a load characteristic of the inputted program using a load characteristic of a program having features that are most similar to the inputted program.

(Mode 4)

The load characteristic estimation unit can estimate a load characteristic of the inputted program using load characteristics of a program group whose similarity with the inputted program is higher than a prescribed threshold.

(Mode 5)

The load characteristic estimation unit can estimate a load characteristic in a case where the inputted program matches a program that has been run on the prescribed computer system, using a load characteristic of the program.

(Mode 6)

A history of load characteristics that have been produced in the prescribed computer system when other programs have been run on the computer system in the past, is recorded in a load characteristic recording unit, and the load characteristic estimation unit can also output a statistical value of a load characteristic of a program that has a feature similar to the inputted program, read from the load characteristic recording unit, as a load characteristic of the inputted program.

(Mode 7)

The load characteristic estimation system is further preferably provided with a load characteristic usage unit that performs information processing using load characteristic information of the inputted program.

(Mode 8)

The program input unit is preferably a programming interface that receives input of a program to be executed in the prescribed computer system, from a user, and the load characteristic usage unit is preferably an information presentation interface that presents load characteristic information of the inputted program to the user.

(Mode 9)

The program input unit is preferably a program execution input unit that inputs a program to the executed on the prescribed computer system, and the load characteristic usage unit is preferably a job execution assignment control unit that controls a program execution procedure and assignment to the computer, using the load characteristic information of the inputted program.

(Mode 10)

The load characteristic estimation system is preferably provided with a function to add, to the load characteristic recording unit, load characteristics produced in the prescribed computer system when the inputted program is run on the computer system after estimating a load characteristic, and a function to add, to the feature information holding unit, feature information of a program obtained by the program feature information acquisition unit.

(Mode 11)

The prescribed computer system is preferably a network computing system in which a plurality of computer resources are used by a plurality of users via a network.

(Mode 12)

As in the load characteristic estimation method described in the second aspect.

(Mode 13)

A prescribed computer system that receives a program by the load characteristic estimation method is preferably a network computing system in which a plurality of computer resources are used by a plurality of users via a network.

(Mode 14)

As in the program described in the third aspect.

(Mode 15)

The prescribed computer system, in which a program is received by the computer, is preferably a network computing system in which a plurality of computer resources are used by a plurality of users via a network.

(First Exemplary Embodiment)

Figure 2:
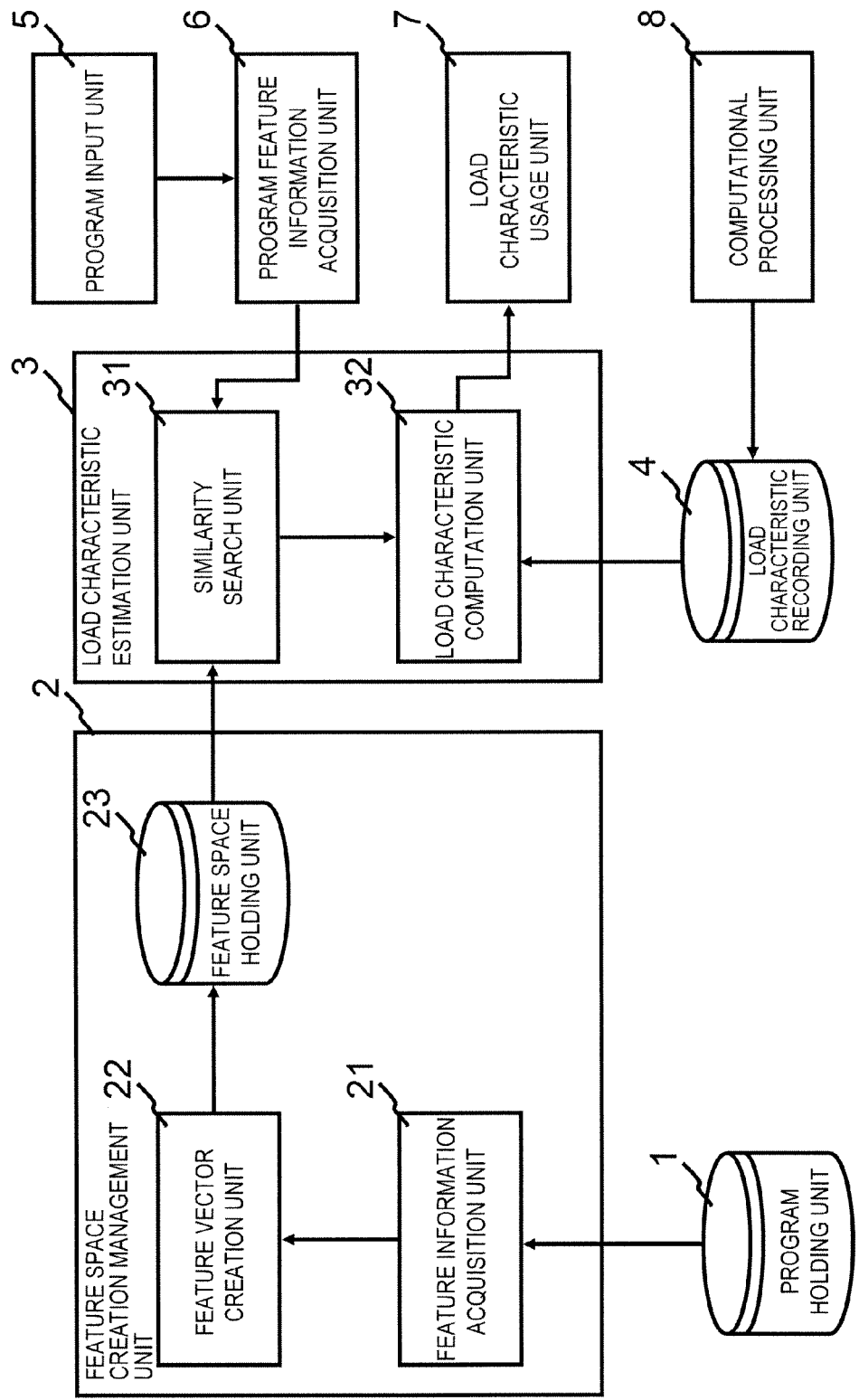
FIG. 2 is a block diagram showing a configuration of a first exemplary embodiment of the invention.

Next, a detailed description is given concerning a first exemplary embodiment of the present invention, making reference to the drawings. FIG. 2 is a block diagram showing a configuration of a first exemplary embodiment of the invention. Referring to FIG. 2, a load characteristic estimation system according to the first exemplary embodiment of the present invention is configured to include: a program holding unit 1 that holds known programs; a feature space creation management unit 2 that creates and holds a feature vector space in order to realize a feature search with respect to the known programs; a load characteristic estimation unit 3 that performs an estimation of a load characteristic of an unknown program that has been newly inputted; a load characteristic recording unit 4 that records load characteristics when the known programs were run in a computational processing unit 8 in the past; a program input unit 5 that receives input of a program to be executed in the computational processing unit 8, from a user; a program feature information acquisition unit 6 that obtains a feature of an unknown program inputted from the program input unit 5; a load characteristic usage unit 7 that performs various types of information processing using a load characteristic of the unknown program estimated by the load characteristic estimation unit 3; and the computational processing unit 8 that performs actual computational processing with regard to the unknown and the known programs.

Here, a "known program" is a program that has been executed at least once by a computer system (corresponding to the computational processing unit 8 of FIG. 2) that runs an inputted program, and whose load characteristics are identified. Furthermore, the "unknown program" is a program that has never been executed by the computer system (corresponding to the computational processing unit 8 of FIG. 2) that runs an inputted program, and whose load characteristics are unknown.

The load characteristics are actual measured values such as execution time, input output data volume, and power, when a certain program is run on a computer system; and plural actually measured value groups of these, average values, and various statistical values such as distributions, when execution has been performed a prescribed number of times in the past. In actuality, in accordance with the usage object of the load characteristics, suitable items are selected from these values as indices representing usage amount, computational cost and the like, of the abovementioned computer resources (for specific examples, refer to FIG. 8 to FIG. 10).

The program holding unit 1 is configured by a storage device that holds content information of programs run in the computational processing unit 8 including programs inputted from the program input unit 5. The "program content information" is data of the program itself, or of an arbitrary format in which program features can be analyzed. For example, the data may be an identifier that identifies a program type, or source code of the program, documents or metadata indicating processing content of the program, combinations of source code and documents, and the like. With regard to holding modes thereof, information is held in various ways such as being stored as files in a file system, being stored as data base records, and the like.

The "program feature information" is information that can be extracted from program content information, and is information that is necessary in order for a feature vector creation unit 22 to create a feature vector. For example, relevant information includes words appearing in program source code, frequency of appearance thereof, context information when a program is called by another program, program names described within program documents, usage method descriptions, and the like. Specifically what information is necessary is determined according to the method of creating the feature vector.

The "program feature vector" is an X-dimension vector numerically representing features of the program. Clearly, usage of a I-dimension vector is possible, or of different values for each search query, rather than a fixed value for each program.

A general search engine has a mechanism to search program feature information at high speed, hold an index that can be referenced, and perform a portion of or all computations of score values (corresponding to program feature vector) for ranking when a search is done, and this method can be used in the present invention.

The feature space creation management unit 2 is configured from a feature information acquisition unit 21 that obtains content information of a program stored in the program holding unit 1 and obtains feature information by analyzing the program content information, a feature vector creation unit 22 that creates a feature vector of a program using the feature information analyzed by the feature information acquisition unit 21, and a feature space holding unit 23 that holds a feature vector set created by the feature vector creation unit 22.

The feature information acquisition unit 21 creates feature information of a program necessary for feature vector creation processing in the feature vector creation unit 22, according to content information of the program stored in the program holding unit I. For example, in a case where the feature vector creation unit 22 requires words that appear in the source code of the program and their frequency of appearance as feature information, the feature information acquisition unit 21 reads the content of the source code and performs processing to count the words that appear and their frequency of appearance.

The feature vector creation unit 22 uses the feature information obtained by the feature information acquisition unit 21 to create a feature vector. The feature vector represents program features as numerical data according to an arbitrary number of dimensions. For example, an X dimensional vector is obtained by having respective words that appear in all programs inside the program holding unit 1 as one dimension of a vector, and frequency of appearance of these words within the programs or values obtained by converting these by weightings calculated using TF/IDF (Term Frequency/Inverse Document Frequency) or the like, as values of the dimensions. Here, X is the number of types of words appearing inside all programs. Furthermore, processing to reduce this X-dimension vector to a vector of an arbitrary number of dimensions by a singular value decomposition method or the like may also be performed by the feature vector creation unit 22. A description is given in Non-Patent Document 3 concerning vector dimension reduction using a method such as singular value decomposition or the like.

The feature space holding unit 23 realizes a function of recording feature vectors of respective programs, created by the feature vector creation unit 22, and implementation is realized by a storage device with a semiconductor memory, a magnetic disk, or the like.

The load characteristic estimation unit 3 is configured to include a similarity search unit 31 that searches a known program set having features that are similar to an unknown program inputted by the program input unit 5, and a load characteristic computation unit 32 that estimates the load of the unknown program inputted by the program input unit 5, using load characteristic information in past computations of a similar known program computed by the similarly search unit 31. According to this configuration, the load characteristic estimation unit 3 uses information of a feature space held and managed by the feature space creation management unit 2, to fulfill a role of estimating the load characteristic of the unknown program inputted by the program input unit 5.

The similarly search unit 31 creates a feature vector using the feature information of the unknown program inputted by the program feature information acquisition unit 6 (performs processing identical to the feature vector creation unit 22), and performs calculation of degree of similarity among feature vector groups of known programs held in the feature space holding unit 23. By this processing, a set of known programs similar to an unknown program is obtained.

The load characteristic computation unit 32 performs processing to obtain load characteristic information with regard to the set of known programs similar to the unknown program, obtaining by the similarity search unit 31, and uses the load characteristic information thereof to compute an estimated value of a load characteristic of the unknown program.

The load estimation for the abovementioned unknown program can be represented by the following expression.

When a load characteristic of program i is $l_i$, and degree of similarity of program i with respect to program x is $S_{ix}$, the similarity degree set with respect to the program x is $S_x=\{S_{1x}, S_{2x}, \ldots, S_{Ix}\}$, and the set of load characteristics of the program is $L=\{l_1, l_2, \ldots, l_I\}$. At this time, the load estimation processing to estimate a load characteristic lx of the program x can be shown by performing computation of a load estimation function F(S,L) in the following (Expression 1).

$$lx=F(S,L) \quad \text{(Expression 1)}$$

Various algorithms can be applied as contents of the load estimation function F, but here, as a simple example, a description is given citing an example of a method of using a load characteristic of the most similar program. Furthermore, here, the larger the similarity degree S is, the higher the value of the similarly degree of the program is. It is to be noted that the cosine of the vectors may be used as one general index, by a method of calculating the similarity degree among the vectors, and in this case larger is taken as indicating similarity. The maximum in this case is 1. In this case, for a program α that is most similar to the unknown program x, computation can be performed to find $S_{\alpha x}$ that is $\max(S_x)$. That is, F(S,L) can be indicated as described below.

$$F(S,L)=l\alpha \quad \text{(Expression 2)}$$

Note that in program α, α satisfies $S_{\alpha x}=\max(S_x)$.

A load characteristic recording unit 4 realizes a function of recording load characteristics of a program executed in the computational processing unit 8. The load characteristic recording unit 4 is implemented as a storage device by a semiconductor memory, magnetic disk, or the like. It is to be noted that in the example of FIG. 2, the load characteristic recording unit 4 is described as a block external to the computational processing unit 8, but it may be configured as a part of the computational processing unit 8.

The program input unit 5 receives input of content information of the program to be executed in the computational processing unit 8, and transfers this to the program feature information acquisition unit 6. The content information of the program is the same as the description above.

A programming interface for programming a program to be executed in the computational processing unit 8, or an interface to designate a file of program source code or the like as a program to be executed are applicable, as a specific example of the program input unit 5. Furthermore together with the program content information, it is possible to have a form for receiving input of ancillary information or hint information (what a program is used for, estimated execution time, or the like) from a user interface.

The program feature information acquisition unit 6 fulfills a function of analyzing the program content information transferred by the program input unit 5, and of obtaining feature information necessary for creating a feature vector. Its role is almost the same as the feature information acquisition unit 21 of the feature space creation management unit 2, and program feature information is the same as the description described above.

The load characteristic usage unit 7 is a means for providing various types of processing, using the load characteristics of an unknown program estimated by the load characteristic estimation unit 3. For example, a system that presents required time and cost before performing actual computation of an unknown program to a user, or a system that controls an execution procedure of the unknown program in the computational processing unit 8, are applicable.

The computational processing unit 8 is a computer system that performs computational processing; specifically, a distributed processing computational system built as a computer cluster, or a network computing system in which computer resources are used by a plurality of users via a network, as represented by cloud computing or large scale computers, are applicable. Furthermore, the computational processing unit 8 is provided with a function to record load characteristics of processing performed in the computational processing unit 8. There is no particular limitation to methods of concretely implementing the function of recording the load characteristics, and implementation is possible as software running in the computational processing unit 8, or by hardware connected internally or externally to the computational processing unit 8.

The program holding unit 1, the feature space creation management unit 2, and the computational processing unit 8 need not he physically held by the load characteristic estimation system of the present exemplary embodiment, and a mode using an external resource may also he used. For example, in a case where a system such as a program source code search engine can be separately used, it is possible to access the system in question and use index information obtained as a feature space. Furthermore, in the same way with regard to program load characteristics, it is also possible to use a configuration that obtains the load characteristic information of the program from another computer system.

Next, a detailed description is given concerning overall operation of the present exemplary embodiment. Below, as operations of the load characteristic estimation system of the present exemplary embodiment, the description is broadly divided into three parts: feature space creation, load characteristic recording, and load estimation.

(Feature Space Creation Processing)

Feature space creation processing is processing to create a feature vector for a known program group required when similarity search processing is performed for load estimation processing. A trigger for executing the feature space creation processing is arbitrary, but a description is given assuming that the feature space creation processing in the present exemplary embodiment takes time in a relative sense, and assumes generation in advance before the load estimation processing. However, in order that processing corresponding to the feature space creation processing is carried out at sufficiently high speed by a feature space creation algorithm or a similarity search algorithm, the feature space creation processing may be performed at a time of similarity search processing during the load estimation processing.

Figure 3:
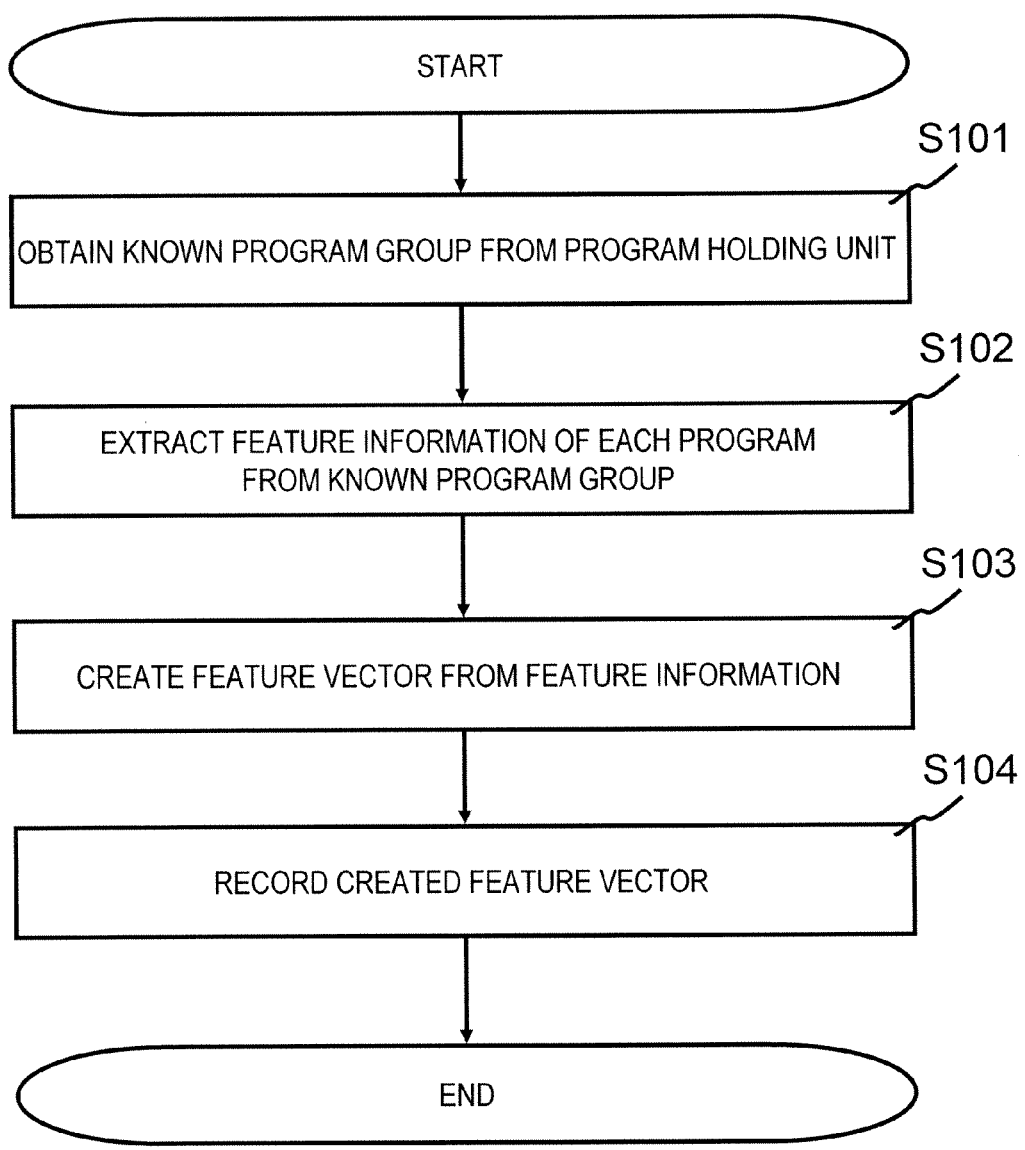
FIG. 3 is a flowchart showing feature space creation processing in the first exemplary embodiment of the invention.

FIG. 3 is a flowchart showing the feature space creation processing. Referring to FIG. 3, first the feature information acquisition unit 21 obtains content information of a program group stored in the program holding unit 1 (step S101).

Next, the feature information acquisition unit 21 extracts feature information of each program from content of the known program group (step S102). For example, processing to extract words that appear and word frequency thereof from the source code as the feature information, is applicable. Furthermore, in order not to repeat the processing of steps S101 to S102 when it is necessary to re-perform the feature space creation processing, the feature information acquisition unit 21 may be provided with a storage means, and the feature information may be recorded.

Next, the feature vector creation unit 22 uses this feature information group to create a feature vector for each program (step S103). For example, processing to create the feature vector by performing calculation of weightings from the extracted words that appear and the word frequency, is applicable. In addition, processing may be included to apply a technique of dimension reduction of the feature vector.

Finally, the feature vector creation unit 22 records the created feature vector in the feature space holding unit 23 (step S104).

In order to enable search of similar programs with higher accuracy in the similarity search unit 31, the feature space creation processing described above is desirably repeated each fixed time period. Or, the feature space creation processing may be executed every time a prescribed number of programs are added to the program holding unit 1. A trigger for invoking this feature space creation processing is decided as appropriate in accordance with accuracy of the estimation of a required load characteristic, or with load and processing capability of a computer forming the feature space creation processing unit 2.

According to the trigger for invoking the feature space creation processing as described above, it may be not necessary to re-create all program group feature vectors. For example, a case may be cited of where a feature vector is generated each time an unknown program is added, and the feature vector is stored in the feature space holding unit 23. At a point in time when a feature vector of an unknown program is created in step S304 of a load characteristic estimation flowchart to be described later, similar to the case of storing in the feature space holding unit 23, there is no need to recalculate the feature vector.

(Load Characteristic Recording Processing)

The load characteristic recording processing is processing to record a load characteristic of a program that is run in the computational processing unit 8. This processing basically operates independently of the feature space creation processing and the load estimation processing. Recording is performed each time a program that is a target for load characteristic recording is run in the computational processing unit 8. A time band for performing the load characteristic recording is arbitrary, and may be the entire time the computational processing unit 8 is operating, or may have the form of sampling only a certain arbitrary time band.

Figure 4:
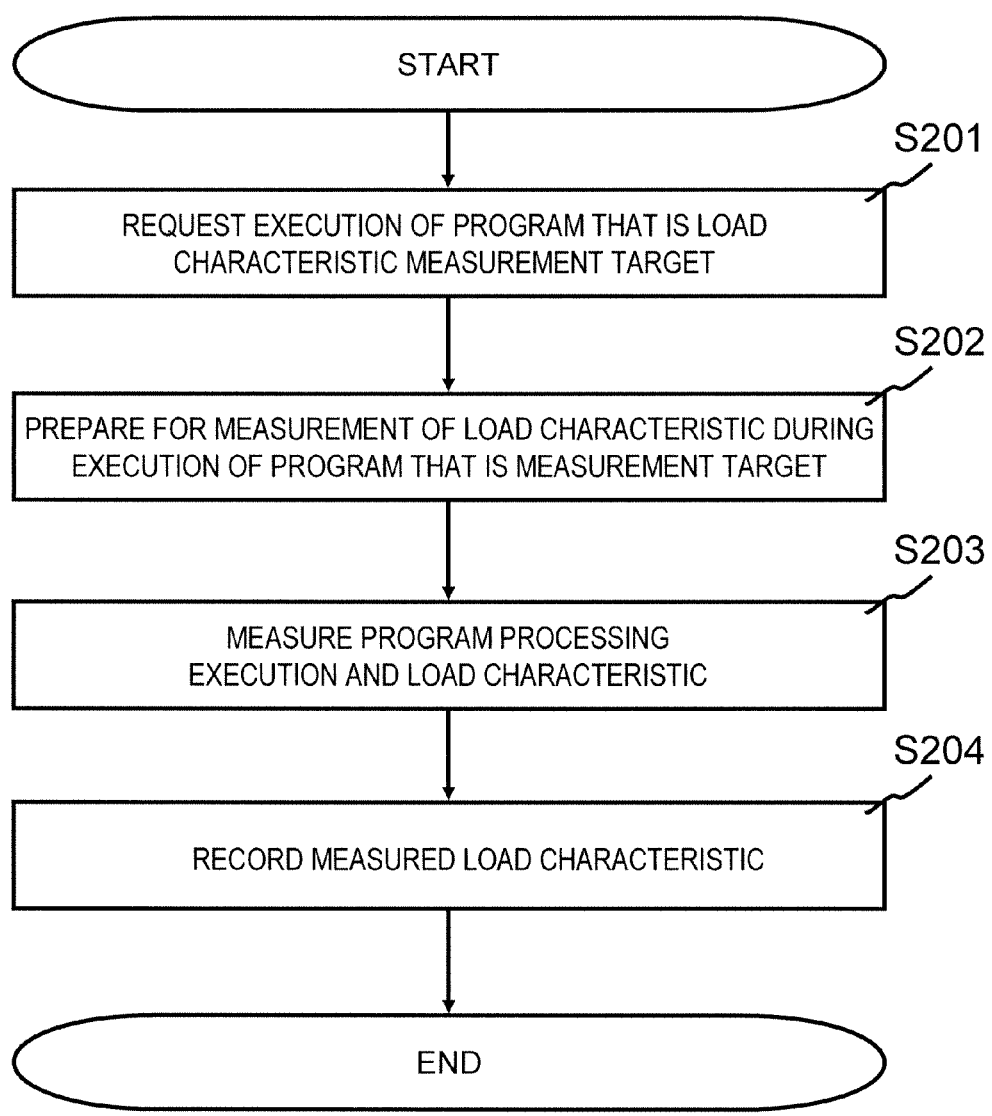
FIG. 4 is a flowchart showing load characteristic recording processing in the first exemplary embodiment of the invention.

FIG. 4 is a flowchart showing the load characteristic recording processing. Referring to FIG. 4, first, on receiving a request to execute a program that is a target for load characteristic recording (step S201), the computational processing unit 8 makes preparation for recording the load characteristic during execution of the program in question (step S202). This preparation may include turning a measuring device ON, and starting up a measuring process or the like. It is to be noted that in a state where the preparation is complete, that is, a state where recording is continually taking place, this type of operation is not necessary.

Next, the computational processing unit 8 performs processing execution of the program in question and during this, measures load characteristics (step S203). Finally, the measured load characteristics are recorded in the load characteristic recording unit 4 (step S204).

(Load Characteristic Estimation Processing)

The load characteristic estimation processing estimates a load characteristic of an unknown program. A trigger for performing the processing depends on usage mode of the load characteristic usage unit 7, but in the description of the present exemplary embodiment it starts when content information of a program is inputted from the program input unit 5.

Figure 5:
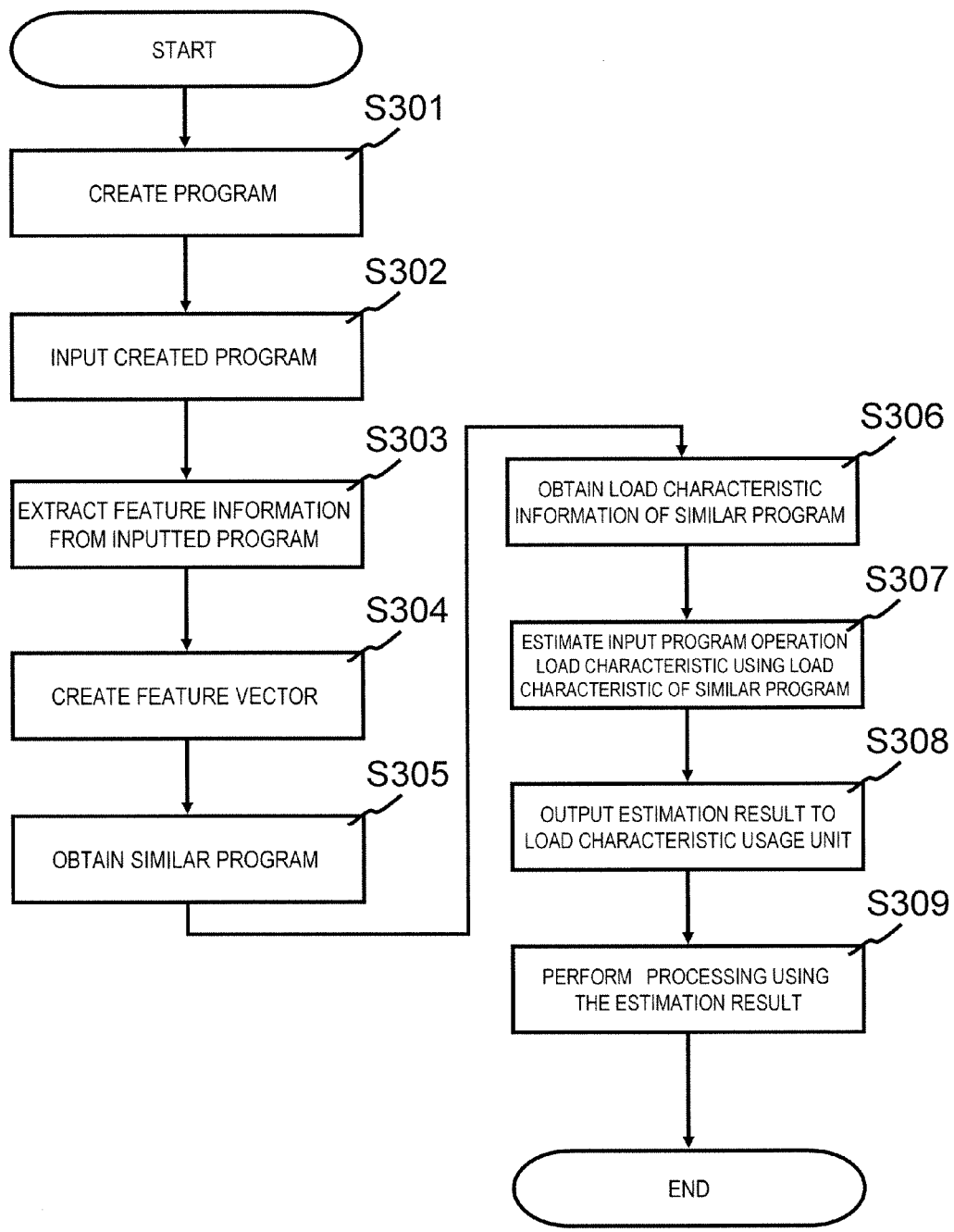
FIG. 5 is a flowchart showing load characteristic estimation processing in the first exemplary embodiment of the invention.

FIG. 5 is a flowchart showing the load characteristic estimation processing. First, a user/developer creates a program (an unknown program) to be executed in the computational processing unit 8 (step S301). Next, the user/developer inputs content information of the created program (the program to be executed in the computational processing unit 8) to the unknown program input unit 5 (step S302).

It is to be noted that the sequence of the abovementioned steps S301 and S302 is not fixed, and in a case of using a general programming interface, the abovementioned steps S301 and S302 are repeatedly executed. An example thereof is in a system where an estimation result of the load of the inputted program is given as a response to the user, an instruction to execute the program in question is received, and a recommendation is given to correct the program.

Next, the program feature information acquisition unit 6 uses content information of the inputted program to obtain feature information of the program (step S303). In this regard, with program source code as content information for example, and appearing words that appear within the source code and word frequency thereof as feature information, processing of reading this program source code file, analyzing character strings within the source code, and calculating the appearing words and the appearance frequency, is applicable.

Next, by using the feature information obtained by the similarly search unit 31, the feature vector of the unknown program is created (step S304). In this processing, for example, with the feature information as the words appearing in the source code and word appearance frequency thereof, numerical values thereof obtained in step S303 are used to create a feature vector of the unknown program. For example, in the processing, with the respective appearing words as respective dimensions of an X dimension feature vector space, a vector fitting the word appearance frequency in element values of respective dimensions is created, and arbitrary weighting calculation processing is performed to create a vector of element values, or dimension compression processing (dimension reduction) from these vectors is performed to create a feature vector of lower dimension than X.

Next, the similarity search unit 31 obtains a similar known program group by similarity search processing (step S305). The number of programs obtained in the known program group differs according to the estimation algorithm run in step S307, and is an arbitrary number. Furthermore, with regard to "obtaining a known program group", it is sufficient to obtain adequate information for obtaining computational characteristics from the load characteristic recording unit 4 in step S306, for example, program identifiers (an ID for identifying a program, a hash value, or the like).

Furthermore, the similarity search processing is performed by using a set of feature vectors recorded in the feature space holding unit 23, and the feature vector of the unknown program created in step S304. The similarly search using the feature vectors can use various methods. An example thereof is described on p. 31 of Non-Patent Document 3. For example, there are methods of using vector inner products or cosines. Since performing the inner product calculation for feature vectors of all known programs leads to an increase in calculation amount, a mechanism to decrease the calculation amount may be incorporated, as performing cluster classification in advance, performing calculation of degree of similarity for only representative values of the cluster, and performing calculation of degree of similarity for only feature vectors of known programs included in a cluster with the highest degree of similarity (or a cluster greater than or equal to a certain degree of similarity). An existing technique such as the K-means method or the like can be applied as the cluster classification technique.

Next, the load characteristic estimation unit 3 uses an identifier of the similar known program group obtained in step S305 to obtain the load characteristic estimation value of a similar known program from the load characteristic recording unit 4 (step S306). Furthermore, the load characteristic estimation unit 3 uses the load characteristic value of a similar program to perform the load characteristic estimation of the inputted program (step S307).

Various techniques can be considered for the load characteristic estimation algorithm of step S307, but here the load characteristic value of the known program most similar to the inputted program is used as the load characteristic of the inputted program. At this time, in step S305 only one known program with highest similarity is identified. In step S306, the load characteristic value of this known program is obtained from the load characteristic recording unit 4. In step S307, the obtained load characteristic value is taken as the load characteristic estimation value of the inputted program.

Next, the load characteristic estimation unit 3 transfers the load characteristic estimation value obtained in step S307 to the load characteristic usage unit 7 (step S308). Then the load characteristic usage unit 7 performs processing using the transferred load characteristic estimation value (step S309).

For example, in a case of a system where a response of the load characteristic of an inputted program is given to the user/developer, the load characteristic usage unit 7 performs processing to form and present to the user the load characteristic value obtained in step S309.

It is to be noted that in the flowchart of FIG. 5, the flow is for performing load estimation for only an unknown program, a program created by the user/developer. However, an estimation of the load characteristic of a known program naturally may be allowed.

In this case, step S301 is unnecessary, program content information need not be inputted in step S302, and it is sufficient to transfer only the program identifiers. In addition, the feature vector creation processing of steps S303 to S304 may take the form of obtaining a feature vector of the identifiers from the feature space storage unit 23. Furthermore, the estimation processing after step S306 may take the form of transferring a past load characteristic of the known program itself to the load characteristic usage unit 7 at it is, or the load characteristic of another similar program may be used to estimate the load characteristic according to a prescribed algorithm.

By so arranging, it is possible to perform load characteristic estimation for the known program. With regard to a program in which characteristic load estimation is performed once, by a similar technique, when estimation is performed two or more times, it is possible to improve the estimation accuracy based on the execution history of the program itself.

It is to be noted that in the abovementioned example a description was given in which the load estimation processing is started when the program content information is inputted from the program input unit 5, but consideration may be given to doing so immediately before a program runs in the computational processing unit 8, as an example of another processing execution trigger for the load estimation processing. By so arranging, it is possible to perform scheduling that reflects the estimated load characteristic.

As described above, in the present exemplary embodiment, it is possible to estimate the load characteristic of an inputted program before the program is executed by the computational processing unit 8. A reason for this is that the configuration is such that by using a similarity search result using a characteristic of a known program and a characteristic of an unknown program, is o possible to identify a program having a characteristic nearest to the inputted program, and to execute processing to estimate a load characteristic using the load characteristic thereof.

(Second Exemplary Embodiment)

Figure 6:
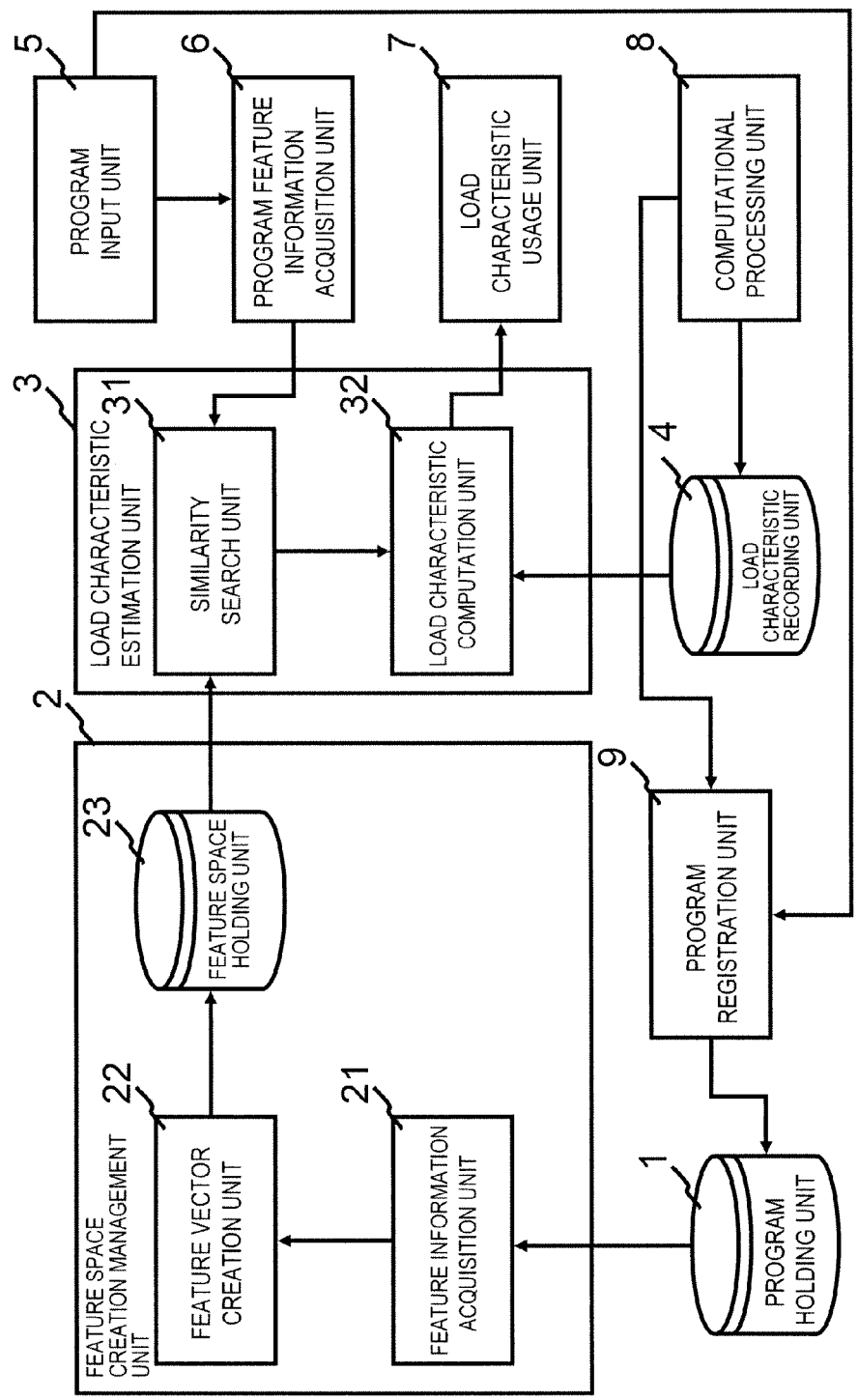
FIG. 6 is a block diagram showing a configuration of a second exemplary embodiment of the invention.

Next, a detailed description is given concerning a second exemplary embodiment of the present invention, making reference to the drawings. FIG. 6 is a block diagram showing a configuration of the second exemplary embodiment of the invention. Referring to FIG. 6, the second exemplary embodiment of the invention has a configuration in which a program registration unit 9 is added to the configuration (refer to FIG. 2) of the first exemplary embodiment. Since the configuration otherwise is similar to the first exemplary embodiment, the description below is centered on points of difference thereof.

The program registration unit 9 is a means for registering content information of an unknown program in a program holding unit 1, when the unknown program is executed in a computational processing unit 8. This type of program registration unit 9 can be realized by a program that is run on an arbitrary computer device.

By having this type of configuration, since it is possible to use a previously inputted unknown program in an estimation of a load characteristic, an effect is obtained of improving the estimation accuracy of the load characteristic. For example, in a case where an identical program or a program having a similar feature is inputted, the load characteristic of a program registered in the program registration unit 9 is referred to when estimating the load characteristic of the inputted program.

Registration of content information of an unknown program may be performed last in load characteristic recording processing. For example, after step S204 in the load characteristic recording processing flowchart in the first exemplary embodiment shown in FIG. 4, the program registration unit 9 may start the registration processing.

The program registration unit 9 is not limited to an arrangement shown in FIG. 6, and can be provided in a load characteristic usage unit 7, the computational processing unit 8, or a feature space creation management unit 2. Registration of the program content information in the program holding unit 1 by the program registration unit 9 may be performed at the trigger of invocation of feature space creation processing shown in FIG. 3. Furthermore, a configuration may be used in which, by obtaining a feature vector created by the load characteristic estimation processing from the load characteristic estimation unit 3, feature space creation processing shown in FIG. 3 is omitted.

With regard to flow of operations in the load characteristic estimation processing of the program, a method may be used in which characteristic estimation from a load characteristic of a known program is performed, similar to the first exemplary embodiment shown in FIG. 5.

According to the present exemplary embodiment that uses the above type of configuration, an improvement can be anticipated in estimation accuracy when an estimation is performed a second or subsequent time for an unknown program for which a characteristic load estimation was performed once. A reason for this is that execution history of an unknown program itself is used in future load characteristic estimation processing. Furthermore, according to the present exemplary embodiment, it is possible to use the load characteristic of the program in question that has been obtained by being run in the computational processing unit 8, in estimation of the newly inputted unknown program.

(Configuration Example of Feature Space Creation Management Unit)

Figure 7:
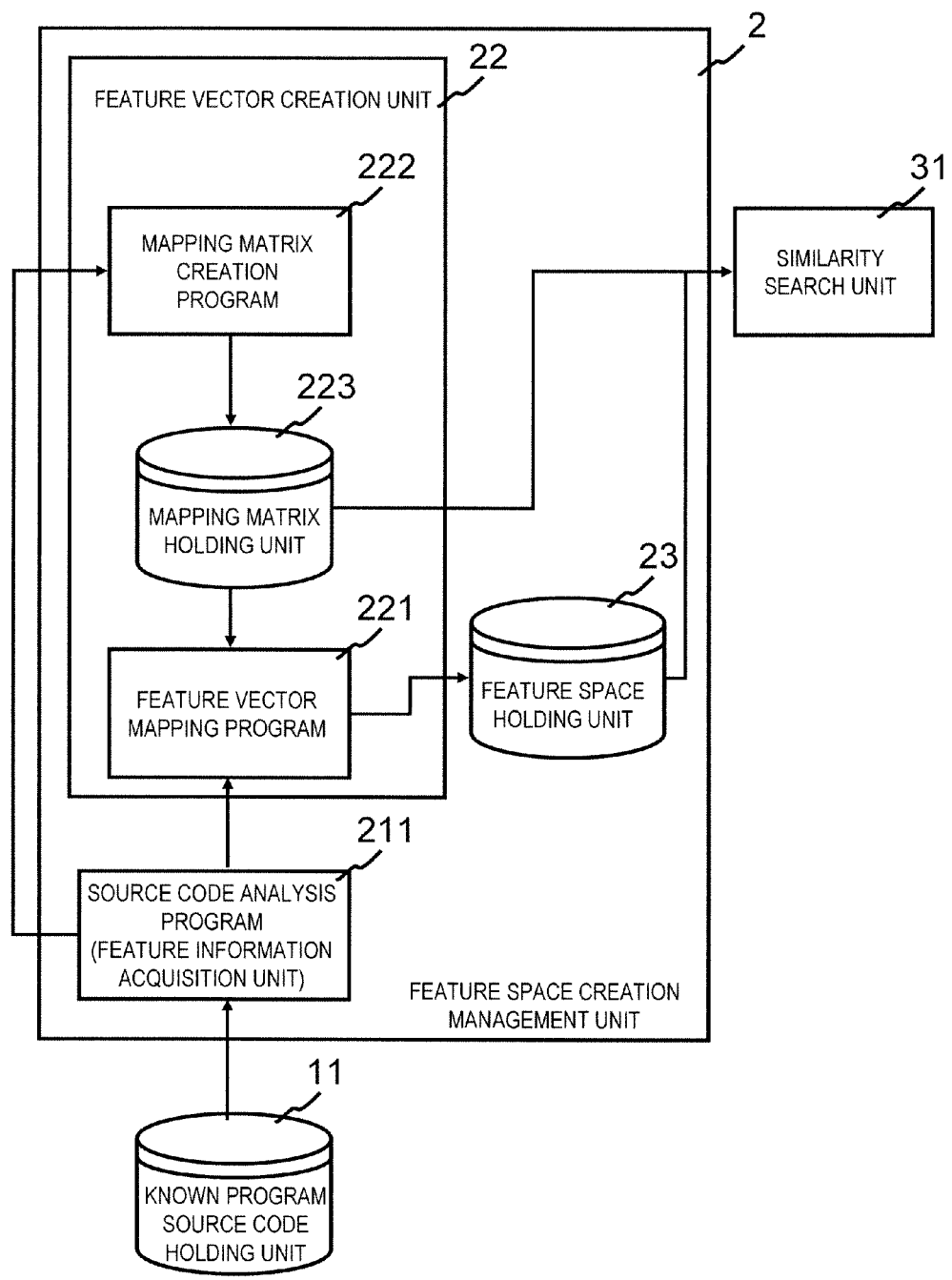
FIG. 7 is a block diagram showing a configuration example of a feature space creation management unit in the first exemplary embodiment of the invention.

Next, a more concrete description is given of details of the load characteristic estimation system according to the first and second exemplary embodiments as described above. FIG. 7 is a block diagram showing a configuration example of the feature space creation management unit in the first exemplary embodiment of the invention described above.

A known program source code holding unit 11 of FIG. 7 corresponds to the program holding unit 1 of FIG. 2, and holds the source code of a program as program content information. This type of known program source code holding unit 11 can be realized by a data storage device (for example, a file server or the like) that can be referred to by a computer that implements the feature space creation management unit 2.

The feature space creation management unit 2 is configured by being provided with a source code analysis program 211, a feature vector mapping program 221, a mapping matrix creation program 222, a mapping matrix holding unit 223, and a feature space holding unit 23. This type of feature space creation management unit 2 is implemented by a computer provided with a central processing unit such as a CPU, and a memory such as a semiconductor memory.

The source code analysis program 211 is implemented by a program that runs a feature information acquisition unit 21 of FIG. 2 on a computer.

The feature vector mapping program 221, the mapping matrix creation program 222, and the mapping matrix holding unit 223, are implemented by a program that runs a feature vector creation unit 22 of FIG. 2 on a computer, and a data holding means.

The source code analysis program 211 obtains the source code to be analyzed from the known program source code holding unit 11, and obtains feature information by reading file content. If the feature information is taken as appearing words (index terms) and frequency thereof (a weighted value is also possible) the source code analysis program 211 performs processing to analyze character strings appearing in the source code and to extract these. As a general technique of information retrieval, processing to exclude general words and meaningless words is possible, without treating all appearing words as index terms, and such processing may be performed by the source code analysis program 211.

By obtaining appearing words (index terms) of plural known source codes and frequency thereof, it is possible to create an m×n data matrix. At this time, m is the number of index terms and n is the number of programs. A vertical vector (n dimensions, m items) in this data matrix D is a vector indicating program content. This n dimension vector may be treated as a feature vector of a program as it is, but creation of a feature vector in which the number of dimensions is reduced, from the viewpoint of computational amount or memory capacity, is performed in document retrieval technology. A configuration of FIG. 7 is a configuration that assumes creation of a feature vector with reduction of the number of dimensions.

The mapping matrix creation program 222 creates a matrix in order to create a feature vector in which the number of dimensions is reduced from the data matrix D. A technique of creating a feature vector from the data matrix D is described in Non-Patent Document 5, pp. 69-77, as document retrieval technology. A simple method is to use (transverse matrix of) a matrix using k left singular vectors of a matrix obtained by performing singular value decomposition of the matrix Q. as a mapping matrix of an original document vector (k is the number of dimensions after reduction). The mapping matrix creation program 222 creates the mapping vector and records it in the mapping matrix holding unit 223.

The feature vector mapping program 221 is a program for performing processing to create a k-dimension feature vector, by the product of a program content vector according to index terms and appearance frequency thereof, and a mapping matrix, and after creating the feature vector, it is recorded in the feature space holding unit 23.

Basically, it is necessary to re-create the mapping vector each time a known program source code, which is the creation source data, increases, but since the effect is small as long as there is no large increase in the program volume, operation may be such as to perform regeneration periodically or each time the program increases above a definite number. Furthermore, when the mapping matrix is re-created, it is also necessary to regenerate the feature vector of the known program.

The similarity search unit 31 performs a similarly search by performing degree of similarity computation for a feature vector set recorded in the feature space holding unit 23, but when the feature vector is created from feature information of an unknown program at this time, a mapping matrix held in the mapping matrix holding unit 223 is necessary. As a result, in the block diagram of FIG. 7, the mapping matrix holding unit 223 and the similarity search unit 31 are connected.

According to this type of feature space creation management unit, it is possible to execute similarity search with a reduced number of dimensions, and is advantageous from the viewpoint of calculation amount and memory volume.

(Modified Example of Load Characteristic Estimation Algorithm)

In the abovementioned first exemplary embodiment a description was given in which a load characteristic of the most similar program is used as a load characteristic of an unknown program x; a description will be given concerning a load characteristic estimation algorithm and exception processing that can be used by the load characteristic estimation unit 3.

(Second Load Characteristic Estimation Algorithm)

As a second load characteristic estimation algorithm, a description is given of a technique of performing load estimation of an unknown program x using a load characteristic of a plurality of similar programs. Here, use is made of a load characteristic $l_i$ of a known program with similarity degree higher than a threshold z. At this time, set $S_x$ of similarity degree $S_{ix}$ is expressed as follows.

$$Sx = \{Six \le z : Si1, Si2; \ldots, Six\} \qquad \text{(Expression 3)}$$

At this time, if it is regarded that the higher the degree of similarity of a program, the more a characteristic of the unknown program x is represented, it is possible to use the following expression as an expression of F(S,L).

$$F(S, L) = \sum \left( l_x * \frac{S_x}{\sum S_x} \right) \qquad \text{(Expression 4)}$$

By using this type of expression, since it is possible to reflect the load characteristic of a plurality of similar known programs in accordance with the size of the similarity degree with the unknown program, more accurate load characteristic estimation can be performed.

(Program Matching)

In the abovementioned second load characteristic estimation algorithm, in a case where the unknown program matches any of the known programs, it is possible to add a condition to estimate the load characteristic, using only this precedent.

Furthermore, there are various methods used in regarding a program to be matching, and here a case where $S_{ix}=1$ is regarded as matching a program. Thereupon, in the abovementioned Expression 3, by having a condition abstracting the set $S_x$ of similarity degree $S_{ix}$ as a threshold z=1, an estimation for only a matching precedent is possible.

By using without change a known load characteristic of the same program that has been executed in the past, it is possible to improve the estimation accuracy for the load characteristic in a case where a program matches.

(Consideration of Command Line Options)

With regard to the method of executing a program, operations may differ considerably according to differences in command line options and parameters. In such cases, since load characteristics differ considerably, separate handling may be preferable.

In one method, when a response is made to the load characteristic usage unit 7, the response with regard to load characteristics is made for each command line option. In the load characteristic estimation method mentioned in the first exemplary embodiment, a load characteristic value of a program with the highest similarity degree is used. In this case, a search for the program with the highest similarity degree is made for each command line option, and the load characteristics of respective programs are separated and displayed. For example, forms as shown below are used.

program α, no command line option, load characteristic 1
program α, command line option -a, load characteristic $1_a$
program α, command line option -b, load characteristic $1_b$ A second method is one of handling programs with different command line options as separate programs. Specifically, a command line option is handled as one program feature information item, and is used as a parameter for creating a program feature vector.

The second method can be realized, for example, by the following method. First, a k-dimension feature vector is created from appearing words and their frequency in the source code. In addition, a dimension (axis) for command line options is prepared. A real number is assigned to respective contents of each respective command line option. For example, in a case of there being no command line option, with the value of the axis as 0, an assignment of 1 is made for a and 2 is made for b. Finally, the k-dimension feature vector and the command line 1 dimension are combined to create a k+1 dimension vector. By arranging in this way, it is possible to create a $k_+1$ dimension feature vector.

Furthermore, as another method of making a feature vector, a technique may be used wherein command line option parameters are handled in the same way as appearing words within the source code.

An operation may be used such that, when a load characteristic is recorded by the computational processing unit 8, the load characteristic is not recorded with regard to a program to which a specific option is assigned. For example, an operation is performed wherein, since options --help, -h, or --usage are options indicating general program usage methods, they are excluded from being targets for recording of load characteristics. By performing this type of operation, it is possible to remove noise from the load characteristic estimation and to improve estimation accuracy.

Furthermore, a control interface may be provided for a system manager to select and set the algorithm used in a load characteristic computation unit 32, the abovementioned exception processing, options, and the like.

In a case of recording a load characteristic value in accordance with the size of target data of a program in a load characteristic recording unit 4, an estimated value of the size of the target data of the program may be inputted from a program input unit 5 (or is examined using the computational processing unit 8), and the estimated data size and load characteristic value may be used in a response regarding the load characteristic estimation value. For example, in a case where an execution time of 1 second per 10 MB is recorded in the load characteristic recording unit 4, when 100 MB are inputted as the estimated data size, it is possible to give a response of 10 seconds from 100/10.

(Variations of Load Characteristic Response Methods)

In the abovementioned respective exemplary embodiments and specific examples, it was assumed that a certain constant value such as an average or the like is returned as a load characteristic response value, but a form of returning a distribution function may also be used as the response value. For example, in a case where there is a plurality of load characteristics of a certain known program "a" in the load characteristic recording unit 4, this may be regarded as a normal distribution, to give a load characteristic response.

In the first exemplary embodiment, it is possible to respond with a normal distribution of program α that has max($S_x$). In this regard, with an average of $1_α$ as μ, and a distribution as $δ^2$ it is possible to indicate $N(μ, δ^2)$. Furthermore, a distribution function outside of the normal distribution may naturally be used to make a response.

(Load Characteristic Information held in Load Characteristic Recording Unit 4)

With regard to load characteristic information held in the load characteristic recording unit 4, it is possible to use information stored as a local log file inside a cluster node implementing the computational processing unit 8, or a file to other storage summarized by a log collection program. It is adequate if the load characteristic recording unit 4 records necessary and sufficient information as data, in order to calculate the load characteristic.

As specific items, average execution time, average necessary I/O amount, average power consumption, average network usage amount, and the like may be cited. The number of items is arbitrary. Furthermore, it is also possible to use other statistical values (indicator values) such as variance or median, or a distribution state itself, rather than only average values.

Below, variation of load characteristic information held in the load characteristic recording unit 4 is shown. FIG. 8 is an example in which a program identifier and a load characteristic measured value at time of execution thereof are recorded as a record in 1 line. The program identifier is information for identifying a program running in the computational processing unit 8. For example, a program name or a unique ID assigned to the program (in this case a separate ID is managed), are applicable. FIG. 8 is an example in which programs with names Program A and Program B are executed, and these names are used as program identifiers. The example shown has only 4 lines of records, but there is no limitation to the number of records, nor is there any limitation to the number of columns. Furthermore, there is no limitation to the number of tables recording this data. In addition a method may be used in which equivalent information is recorded by being distributed in a plurality of physical devices.

In a case of using an average value as the load characteristic, calculation can be performed using a plurality of load characteristics recorded for the same program recorded in the load characteristic recording unit 4. In the example of FIG. 8, since Program A appears twice (was executed twice in the past), calculation can be performed to obtain an average execution time of 35 seconds, a necessary IO amount of 17.5 KB, and required power of 3000 (W). Clearly an implementation is possible where history records as in FIG. 8 are managed by a database system such as an RDBMS (Relational Data Base Management System) or the like, and a materialized view is created in order to obtain average values thereof.

Although almost the same as the implementation by a materialized view, implementation is also possible in a form where, rather than history records being recorded as in FIG. 8, records are prepared for each program name and the average value table is updated (refer to FIG. 9).

In a case of using a recording system as in FIG. 9, the number of entries of load characteristic information is the same as the number of program identifiers. With this type of recording system, it is possible to reduce the data capacity necessary for recording the load characteristic information.

A decision as to which of the recording systems of FIG. 8 and FIG. 9 to use is made giving consideration to the specification of the load characteristic recording unit 4, required load characteristic accuracy, and the like.

With regard to values recorded as load characteristics and calculated load characteristic values, rather than using an actually measured value as it is, as in the execution time in the abovementioned example, an evaluation value based on an arbitrary definition may be used. For example, a representation is possible with a capacity ratio of data that is to be processed by a program.

load characteristic evaluation value=load characteristic (execution time or the like)/size of data to be processed by program As described above, by representing load characteristic values as data capacity ratios, it is possible to handle programs with different load characteristics such as execution time and the like in a unified manner, depending on the amount of data to be processed.

FIG. 10 is an example of load characteristic information recorded using load characteristic evaluation values. It is also possible to have a form where a column of information in which the data amount and the data amount that can be specified at the time of processing is added to the load characteristic information of FIG. 8, and the load characteristic evaluation value is calculated with a value recorded at the time of load characteristic calculation.

(Program and Jobs)

With a program as a job set, it is possible to use a mode of recording the load characteristic of each job, or estimating a load characteristic of each job. By arranging in this way, it is possible to estimate the load characteristic with good accuracy for a system in which a program is implemented by combining existing programs. As a simple exemplary embodiment, a process (program) created by piping a plurality of commands in a shell in Linux/Unix (registered trademarks) is applicable. Respective piped commands correspond to jobs, and the overall processing corresponds to a program.

(Configuration Example of Computational Processing Unit 8 and Load Characteristic Acquisition Function)

Figure 11:
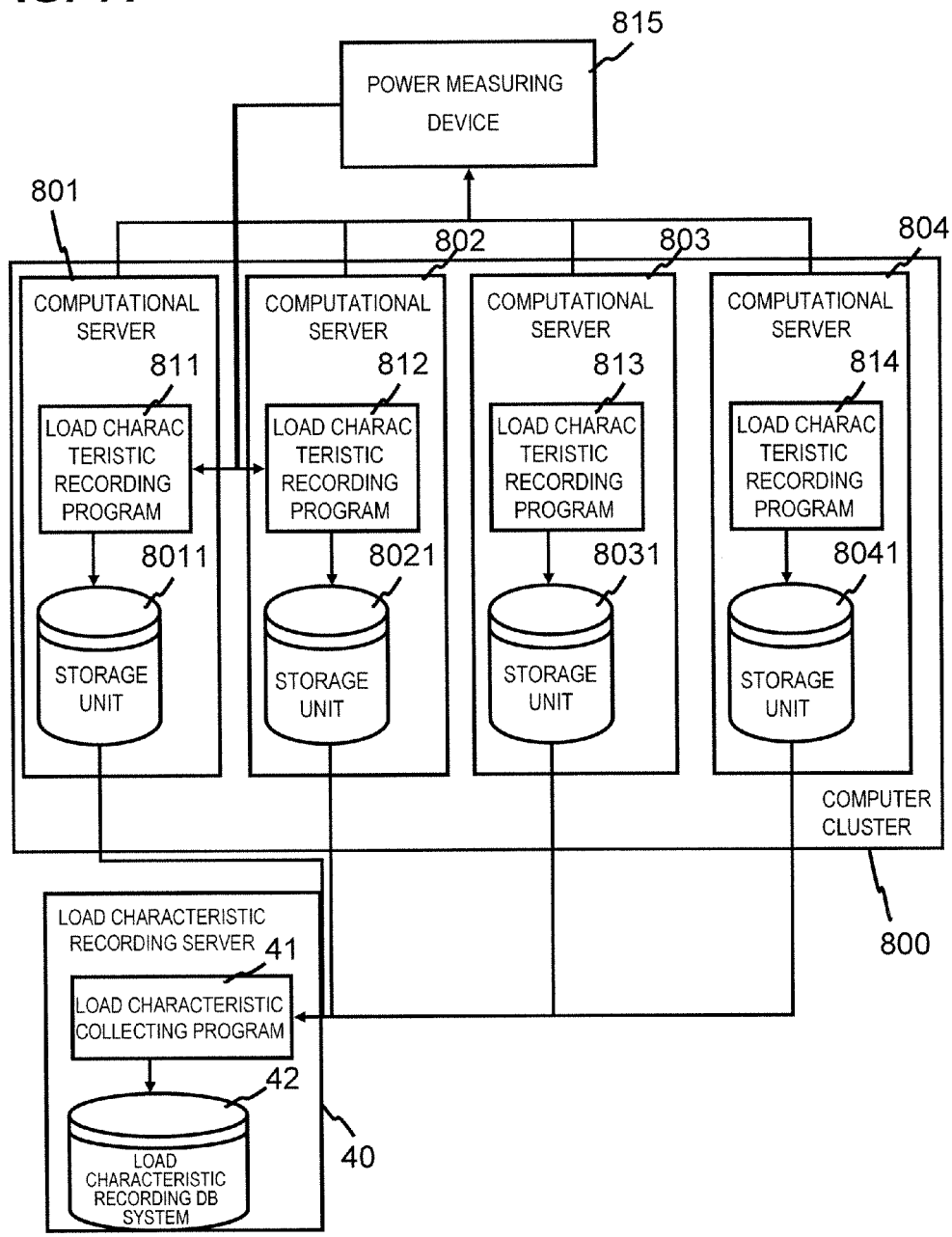
FIG. 11 is a block diagram showing a detailed configuration example of a computational processing unit in the first exemplary embodiment of the invention.

FIG. 11 is a block diagram showing a detailed configuration example of a computational processing unit in the first exemplary embodiment of the invention.

A computer cluster 800 of FIG. 11 corresponds to the computational processing unit 8 of the first exemplary embodiment. The computer cluster 800 is configured by an arbitrary number of computation servers (four in the example of FIG. 11) 801 to 804, which are connected in a network. The computation servers 801 to 804 are configured by storage units 8011 to 8041 implemented by processors providing computational capacity and semiconductor memory or magnetic disks. Furthermore, a configuration can also be used where network storage connected via a network, as in NAS (Network Area Storage) is added as a shared storage device for the computational servers 801 to 804 (not shown in the drawings).

It is to be noted that in the computational server configuration of the computer cluster 800, there is no limitation to physical arrangement. There is no condition such as having to be in the same building or room. Furthermore, there is no limitation concerning the type of network connection, and the computational processing unit 8 may be configured by, for example, connecting a computer cluster in Tokyo and a computer cluster in Osaka by the Internet or the like.

In the configuration of FIG. 11, a load characteristic acquisition function is realized by load characteristic recording programs 811 to 814 and a power measuring device 815. The load characteristic recording programs 811 to 814 are implemented as a process or a software module operating in the respective computational servers 801 to 804. The power measuring device 815 can be implemented by assigning a measuring device to an electrical outlet or power supply of the respective computational servers 801 to 804, or can be implemented by using a measuring instrument function held by a management function of a system that provides power to the computer cluster 800.

In the example of FIG. 11, there is only one power measuring device 815, but the number thereof is arbitrary. For example, a form is possible in which, when the computational processing unit 8 is implemented as a cluster configured by 100 computer servers, one power measuring device is provided for each 50 servers. Furthermore, for an example of a configuration in which computer clusters in Tokyo and Osaka are connected, a form is possible in which power measuring devices are provided in Tokyo and Osaka.

The power measuring device 815 need not be a physical device. A logical estimate by software is also possible. As an example of this, Non-Patent Document 4 describes a method of estimating power consumption of a server according to CPU load rate. In a case of having this method, the power measuring device 815 is implemented as a process or a software module operating in the computational servers 801 to 804.

In FIG. 11, the load characteristic recording unit is implemented by a load characteristic recording server 40. The load characteristic recording server 40 is an arbitrary computer connected by a network to the computer cluster 800 and is provided with a recording device such a magnetic disk, a semiconductor memory, or the like.

More specifically, the load characteristic recording server 40 is provided with a load characteristic collecting program 41 and a load characteristic recording database system 42. The load characteristic collecting program 41 can be implemented as a program operating on the load characteristic recording server 40, and the load characteristic recording database system 42 can be implemented by arbitrary database management software and a recording device.

Naturally, it is also possible to use a form that stores load characteristics in an arbitrary format in a file on a file system or a memory area in the load characteristic recording server 40 secured by the load characteristic collecting program 41, without using database management software or the like.

Furthermore, the load characteristic recording server 40 of FIG. 11 is provided separately from the computer cluster 800, but implementation is also possible by an arbitrary number of computers among the computer servers configuring the computer cluster 800. Also a configuration may be used in which the load characteristic recording programs 811 to 814 perform updating and recording with regard to the load characteristic recording database system 42 running on the load characteristic recording server 40, without providing the load characteristic collecting program 41.

As described above, in the configuration of FIG. 11 various modified arrangements can be used, and the description below details an exemplary embodiment and operations based on the configuration of FIG. 11.

In the computer cluster 800, an entire program or some jobs thereof are executed on the respective computation servers 801 to 804. At this time, a job execution control program that administers job execution on the computational servers 801 to 804 is operating. By the load characteristic recording programs 811 to 814 trapping the timing at which this job execution control program starts job execution and the timing at which it finishes job execution (or having the job execution control program give notification of starting and finishing jobs), the start time and the finish time of job execution that is to be measured are obtained.

The load characteristic recording programs 811 to 814 start measurement at start time for load characteristic value that is to be recorded, and finish measurement after completion. Clearly, it is also possible to use a method of constantly recording the load characteristics, and calculating load characteristics caused by a job from the load characteristic values between finish time and start time.

Examples of measured load characteristic values include execution time, necessary I/O amount, and power consumption amount. A description is given below of a specific measurement method for each of these.

With regard to execution time, measurement is possible by calculating the difference between the start time and the finish time of job execution.

With regard to necessary I/O amount, I/O amount during job execution time can be obtained by using a command enabling obtaining I/O statistical information of an OS (Operating System) as represented by iostat or the like.

The power consumption amount can be calculated from the power consumption amount measured by the power measuring device 815 during job execution time; for example, calculation may be performed from the difference from the power consumption amount at idle time. Furthermore, it is possible to estimate the power consumption amount by periodically obtaining CPU usage rate, and using a technique described in Non-Patent Document 4, without using an external device as in the power measuring device 815

The power consumption of each of the computational servers 801 to 804 can be obtained without problem if the power measuring device 815 performs measurement individually, but it is difficult to obtain the power consumption of a device whose usage is shared by the computational servers 801 to 804. As an example of a device whose usage is shared by such a plurality of devices, a network switch may be cited. The power consumption used by this type of shared device may be reflected in an appropriate ratio regarding usage rate of each server. For example, when a certain program is made up of two jobs and is executed, one job is executed in each of the computational server 801 and the computational server 802. At this time, with the computational servers 803 and 804 being idle, and the network transfer amount used by the computational servers 801 and 802 at job execution time being approximately the same, the power consumption increase amount in a network switch during program execution is added to the power consumption of jobs running on the computational servers 801 and 802.

In the method described up to here, there is no problem in a case where a certain program runs on a single computational server, but in a case where a certain program is made up of a plurality of jobs and these jobs run on a plurality of computational servers, processing in which the load characteristics of each job are aggregated to have load characteristics in program units, is necessary. Finally, load characteristic information in program units is obtained, as shown in FIG. 8, FIG. 9, and FIG. 10. Processing in which load characteristics of jobs are aggregated in this way in program units may be executed by the load characteristic collecting program 41.

Recording units of load characteristics as shown in FIG. 8, FIG. 9, and FIG. 10, may be for each job (a form in which the first column has job identifiers registered). In this case, a form is used in which registration is done in job units in the load characteristic recording database system 42, and when used by the load characteristic estimation unit 3, restoring from job to program is performed.

Furthermore, in a case where a plurality of jobs are executed at the same time on the respective computational servers 801 to 804, it may not be possible to separately extract impacting power consumption amount for each job. The following solution strategy exists for this type of case, and any technique may be used.

in a case where a plurality of jobs (programs) are executed simultaneously, a recording is not made for load characteristics that cannot be separated and measured increased load characteristic amount is assigned according to CPU usage rate for each job increased load characteristic amount is assigned, for the time being, for jobs simultaneously executed in the same time period (Specific Example 1 of Load Characteristic Usage Unit 7)

Figure 12:
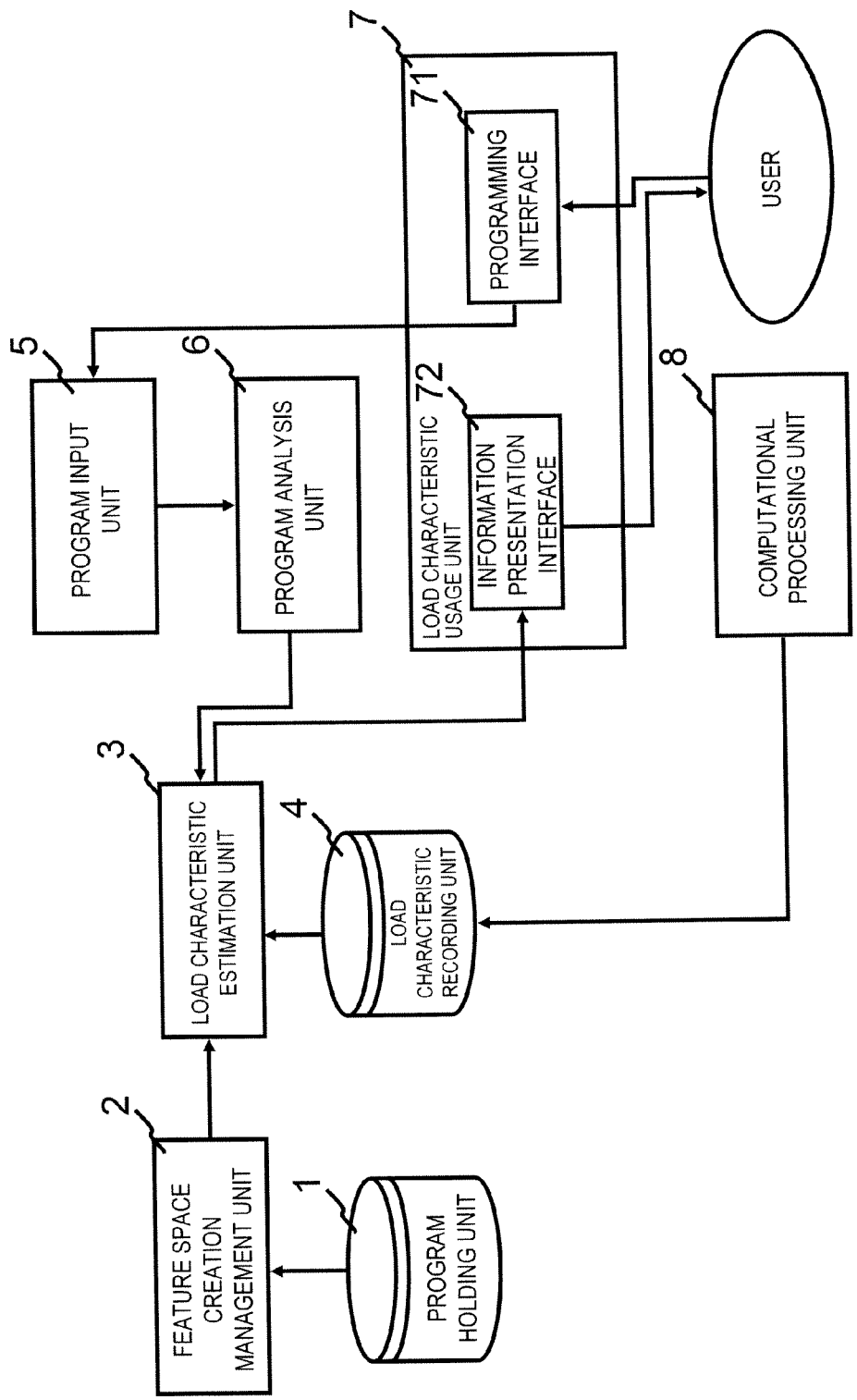
FIG. 12 is a block diagram showing a specific example of a load characteristic usage unit in the first exemplary embodiment of the invention.
Figure 13:
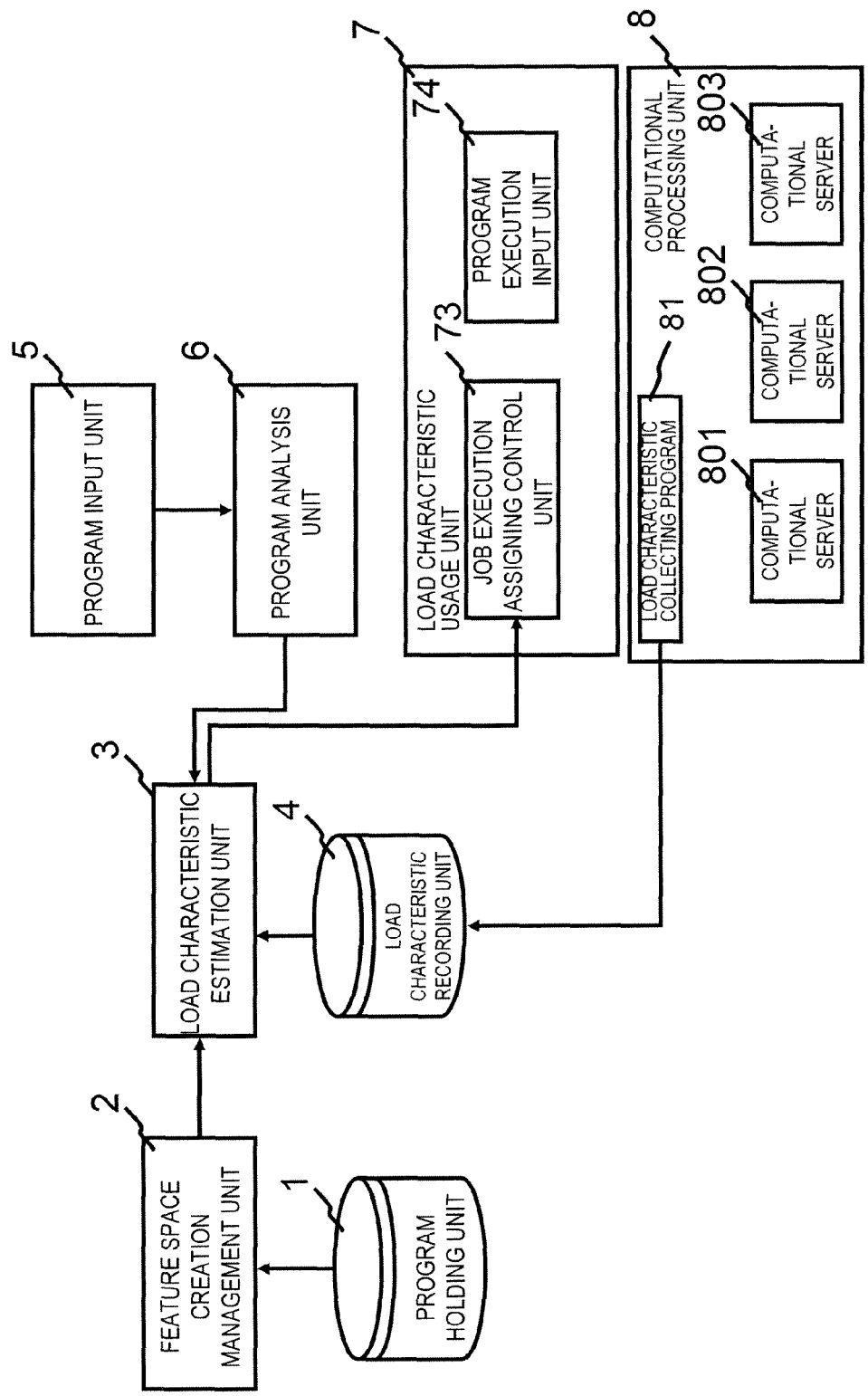
FIG. 13 is a block diagram showing a specific example of a load characteristic usage unit in the first exemplary embodiment of the invention.

Next, a description is given concerning a specific example of the load characteristic usage unit 7 using load characteristics estimated as described above. FIG. 12 and FIG. 13 are block diagrams showing specific examples of the load characteristic usage unit 7 of the first exemplary embodiment of the present invention.

FIG. 12 is an example in which a programming interface 71 and an information presentation interface 72 are provided in the load characteristic usage unit 7.

Referring to FIG. 12, the programming interface 71 is an interface for describing content of computational processing performed in the computational processing unit 8. For example, an editor that describes program source code, or an interface that graphically performs programming by combining program logic stored in a program holding unit 1, is applicable.

A user creates a program via the programming interface 71. The programming interface 71 transfers the created program to the program input unit 5 as an unknown program.

When the program is transferred to the program input unit 5, the transfer need not be done after completing the program creation, and a program under construction may be transferred to the program input unit 5 at an arbitrary occasion (a user request or with the passing of time) during coding. By allowing a request for estimation of a load characteristic on this type of occasion, it is possible to present a load estimation value to the user during program development.

After transfer to the program input unit 5, processing is performed which is the same as the first exemplary embodiment or exemplary embodiments in which the abovementioned respective specific examples are applied, and load characteristics of the program developed by the user are estimated.

The information presentation interface 72 receives and presents an estimated load characteristic. The load characteristic information may be presented as it is, or after undergoing some processing. For example, estimated power consumption may be presented, or charges necessitated for computation may be calculated from the execution time or the required number of computational servers (naturally a configuration is used where information necessary for this is stored in the load characteristic recording unit 4 as a load characteristic). The user views the information of the information presentation interface 72 and may perform a re-correction of the program, or may judge that there is no problem and request execution of the program on the computational processing unit 8.

FIG. 13 is an example where a job execution assigning control unit 73 and a program execution input unit 74 are provided in the load characteristic usage unit 7. The computational processing unit 8 in FIG. 13 is configured by an arbitrary number of plural computational servers 801 to 803. Otherwise, it is the same as the abovementioned exemplary embodiments or the exemplary embodiments in which the abovementioned respective specific examples are applied.

The program execution input unit 74 is a means which, in order to execute the program developed by the user (by an arbitrary means) in the computational processing unit 8, receives the program and an execution plan thereof (general additional information such as option parameters, specific identifiers of data to be processed, and the like) from the user or another program (service).

Furthermore, the program execution input unit 74 does not move the received program immediately to processing execution in the computational processing unit 8, but first performs load characteristic estimation processing of the program. Accordingly, program content information is first transferred to the program input unit 5, and load estimation processing described in the first exemplary embodiment is performed.

The job execution assigning control unit 73 receives the estimated load characteristic information, and decides how to assign the program (or job set in which the program is divided into arbitrary processing units) to the computational servers 801 to 803.

The assignment control here decides from the load characteristic information recorded in the load characteristic recording unit 4, for example, which to select in a case where it takes 30 minutes with one computational server and 20 minutes with four computational servers. At this time, the job execution assigning control unit 73 is aware of the load state of the respective computational servers 801 to 803 and in a case where one computer only has leeway and jobs are backed up in an execution queue in other computers, execution may be performed in the one computer, and in a case where there is leeway in four computers, control is performed to execute using the four computers.

In the configuration of FIG. 13, selection may be performed giving consideration to a decision policy set by the user or to cost of execution.

It is to be noted that the job execution assigning control unit 73 in FIG. 13 is shown as a block separate from the computational processing unit 8, but in actuality it can naturally be operated on a computer (for example, a computer in charge of scheduling) that configures the computational processing unit 8.

Descriptions have been given above of preferred exemplary embodiments of the present invention, but the invention is not limited to the abovementioned exemplary embodiments and further modifications, substitutions, and adjustments can be added within a scope that does not depart from fundamental technical concepts of the invention.

INDUSTRIAL APPLICABILITY

The present invention can be applied to an advance estimation system for program execution cost in a network computing system or large scale computer system. Furthermore, application is also possible to job scheduling in a network computing system or large scale computer system.

EXPLANATIONS OF SYMBOLS

1 program holding unit
2 feature space creation management unit
3 load characteristic estimation unit
4 load characteristic recording unit
5 program input unit
6 program feature information acquisition u
7 load characteristic usage unit
8 computational processing unit
9 program registration unit
11 known program source code holding unit
21 feature information acquisition unit
22 feature vector creation unit
23 feature space holding unit
31 similarity search unit
32 load characteristic computation unit
40 load characteristic recording server
41 load characteristic collecting program
42 load characteristic recording database system
71 programming interface
72 information presentation interface
73 job execution assigning control unit
74 program execution input unit
91 program registration unit
211 source code analysis program
221 feature vector mapping program
222 mapping matrix creation program
223 mapping matrix holding unit
800 computer cluster
801 to 804 computational server
811 to 814 load characteristic recording program
815 power measuring device
8011 to 8014 storage unit

The invention claimed is:

1. A load characteristic estimation system, comprising:
a program input unit into which a program that runs on a prescribed computer system is inputted;
a program feature information acquisition unit that obtains a feature from said inputted program; and
a load characteristic estimation unit that estimates a load characteristic of said inputted program by reading load characteristic information of another program having a feature similar to said inputted program, from a load characteristic recording unit that records a load characteristic which was produced in said prescribed computer system when said other program was run on said computer system at a past time,
wherein said program feature information acquisition unit obtains said feature based on a requirement for creating a feature vector.

2. The load characteristic estimation system according to claim 1, further comprising:

a feature information holding unit that holds feature information of a program run on said prescribed computer system, wherein said load characteristic estimation unit comprises a similarity search unit that performs a search for a similar program using feature information held in said feature information holding unit and feature information of said inputted program.

3. The load characteristic estimation system according to claim 2, wherein said load characteristic estimation unit estimates a load characteristic of said inputted program by using a load characteristic of a program having a feature that is most similar to said inputted program.

4. The load characteristic estimation system according to claim 2, wherein said load characteristic estimation unit estimates a load characteristic of said inputted program by using a load characteristic of a program group having a degree of similarity with said inputted program greater than a prescribed threshold.

5. The load characteristic estimation system according to claim 2, wherein said load characteristic estimation unit, in a case where said inputted program matches a program that has been run on said prescribed computer system, estimates a load characteristic by using a load characteristic of said program.

6. The load characteristic estimation system according to claim 2, wherein said feature information of said inputted program comprises information regarding said requirement for creating said feature vector.

7. The load characteristic estimation system according to claim 2, wherein said similarity search unit performs a calculation of a degree of similarity among feature vector groups of one or more known programs.

8. The load characteristic estimation system according to claim 1, further comprising a load characteristic usage unit that performs an information processing using load characteristic information of said inputted program.

9. The load characteristic estimation system according to claim 8, wherein said program input unit comprises a programming interface that receives an input of a program to be executed by a user on said prescribed computer system, and said load characteristic usage unit comprises an information presentation interface that presents load characteristic information of said inputted program to said user.

10. The load characteristic estimation system according to claim 8, wherein said program input unit comprises a program execution input unit that inputs a program to be executed on said prescribed computer system, and said load characteristic usage unit controls a program execution sequence and assignment to a computer, by using load characteristic information of said inputted program.

11. The load characteristic estimation system according to claim 1, wherein said load characteristic estimation unit estimates a load characteristic of said inputted program by using a load characteristic of a program having a feature that is most similar to said inputted program.

12. The load characteristic estimation system according to claim 1, wherein said load characteristic estimation unit estimates a load characteristic of said inputted program by using a load characteristic of a program group having a degree of similarity with said inputted program greater than a prescribed threshold.

13. The load characteristic estimation system according to claim 1, wherein said load characteristic estimation unit, in a case where said inputted program matches a program that has been run on said prescribed computer system, estimates a load characteristic by using a load characteristic of said program.

14. The load characteristic estimation system according to claim 1, wherein a history of load characteristics produced in said prescribed computer system when another program was run on said computer system at a past time is recorded in a load characteristic recording unit, and said load characteristic estimation unit outputs a statistical value of load characteristics of a program having a feature that is similar to said inputted program read from said load characteristic recording unit.

15. The load characteristic estimation system according to claim 1, comprising:
a unit which adds a load characteristic that was produced in said prescribed computer system when said inputted program was run on said computer system after an estimation of said load characteristic, to said load characteristic recording unit; and
a unit which adds program feature information obtained by said program feature information acquisition unit, to said feature information holding unit.

16. The load characteristic estimation system according to claim 1, wherein said prescribed computer system comprises a network computing system in which a plurality of users use a plurality of computer resources via a network.

17. A load characteristic estimation method, comprising:
receiving an input of a program to be run on a prescribed computer system, from a user;
obtaining a feature from said inputted program; and
estimating a load characteristic of said inputted program by reading load characteristic information of another program having a feature similar to said inputted program, from a load characteristic recording unit that records a load characteristic which was produced in said prescribed computer system when said other program was run on said computer system at a past time,
wherein said feature from said inputted program is obtained based on a requirement for creating a feature vector.

18. The load characteristic estimation method according to claim 17, wherein said prescribed computer system comprises a network computing system in which a plurality of users use a plurality of computer resources via a network.

19. A non-transitory computer readable medium storing therein a program that causes a computer to execute:
a process of receiving an input of a program to be run on a prescribed computer system, from a user;
a process of obtaining a feature from said inputted program; and
a process of estimating a load characteristic of said inputted program by reading load characteristic information of another program having a feature similar to said inputted program, from a load characteristic recording unit that records a load characteristic which was produced in said prescribed computer system when said other program was run on said computer system at a past time,
wherein said feature from said inputted program is obtained based on a requirement for creating a feature vector.

20. The program according to claim 19, wherein the prescribed computer system comprises a network computing system in which a plurality of users use a plurality of computer resources via a network.

* * * * *